US006896117B2

(12) United States Patent
Nomura

(10) Patent No.: US 6,896,117 B2
(45) Date of Patent: May 24, 2005

(54) APPARATUS FOR PROCESSING A SHEET

(75) Inventor: Hiroshi Nomura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 143 days.

(21) Appl. No.: 10/243,653

(22) Filed: Sep. 16, 2002

(65) Prior Publication Data

US 2003/0057141 A1 Mar. 27, 2003

(30) Foreign Application Priority Data

Sep. 21, 2001 (JP) ....................................... 2001-290115

(51) Int. Cl.[7] ............................ B65H 7/12; G07D 7/00; G06F 17/60; G06F 7/00

(52) U.S. Cl. ....................... 194/213; 194/207; 209/555; 209/567; 209/571; 714/30; 902/7; 324/202; 724/25

(58) Field of Search ................................ 194/205, 206, 194/207, 209, 212, 213; 209/555, 556, 567, 571; 202/108, 120; 714/25, 30; 902/7; 324/202

(56) References Cited

U.S. PATENT DOCUMENTS

| | | | | |
|---|---|---|---|---|
| 5,253,167 A | | 10/1993 | Nakamura et al. | |
| 5,938,044 A | * | 8/1999 | Weggesser | 209/534 |
| 2001/0015311 A1 | * | 8/2001 | Mennie | 194/302 |
| 2001/0035603 A1 | * | 11/2001 | Graves et al. | 271/265.01 |

FOREIGN PATENT DOCUMENTS

| | | |
|---|---|---|
| EP | 0854461 | 7/1998 |
| WO | WO 9948040 | 9/1999 |

* cited by examiner

*Primary Examiner*—Donald R. Walsh
*Assistant Examiner*—Kenneth W Bower
(74) *Attorney, Agent, or Firm*—Pillsbury Winthrop LLP

(57) ABSTRACT

The present invention provides an apparatus for processing a sheet. When a medium having various patterns detected by a plurality of detecting sections for individually detecting plural kinds of features from a sheet, each detecting section detects plural kinds of features from the medium. The features detected from the medium are compared with a predetermined reference value so that the condition of the apparatus can be judged.

8 Claims, 13 Drawing Sheets

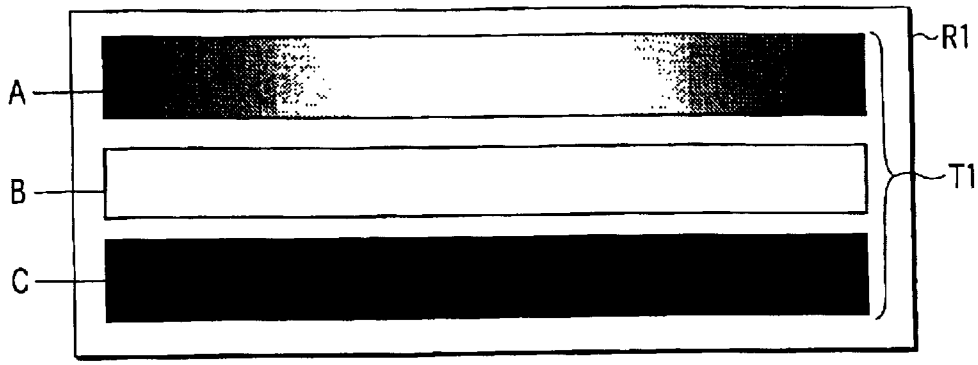
A : Gradation pattern
B : White reference pattern
C : Black reference pattern
FIG. 8
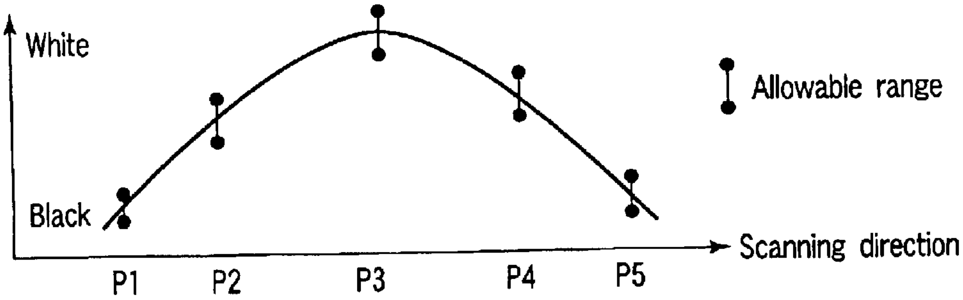
FIG. 9
Pattern A
| | Measured value | Judgment | Allowable value |
|---|---|---|---|
| P1 | 10 | ○ | 0~20 |
| P2 | 80 | ○ | 70~90 |
| P3 | F0 | ○ | E0~FF |
| : | | | |
FIG. 10

| | Measured value | Judgment | Allowable value | |
|---|---|---|---|---|
| White reference (average) | BF | ○ | B0~D0 | |
| Pattern (average) | C0 | ○ | B8~DF | |
| ⟹ Live (actual) data | 01 | 02 | 03 | • • • | 182 |
| | C0 | C3 | C1 | | C0 |
FIG. 11
| | Measured value | Judgment | Allowable value | |
|---|---|---|---|---|
| Pattern C (average) | 10 | ○ | 0~20 | |
| → Live (actual) data | 01 | 02 | 03 | • • • • • | 182 |
| | 10 | 0F | 0E | | 10 |
FIG. 12
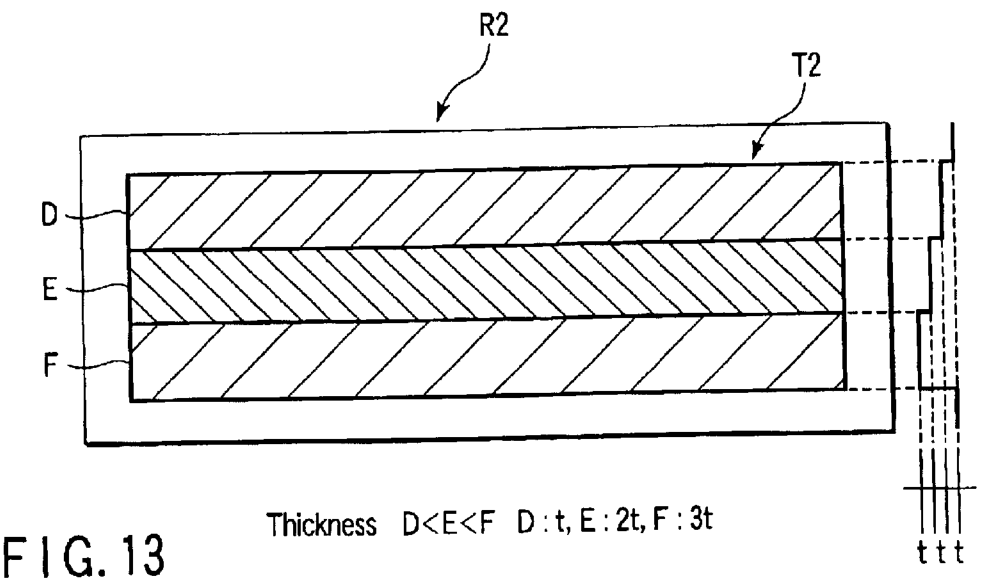
Thickness D<E<F D : t, E : 2t, F : 3t
FIG. 13
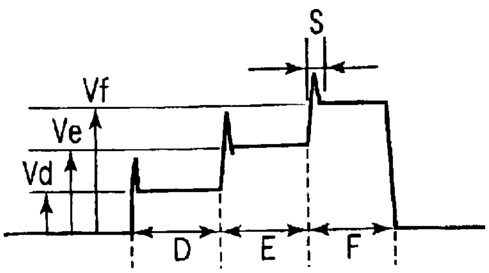
FIG. 14

APPARATUS FOR PROCESSING A SHEET

CROSS-REFERENCE TO RELATED APPLICATIONS

This application is based upon and claims the benefit of priority from the prior Japanese Patent Application No. 2001-290115, filed Sep. 21, 2001, the entire contents of which are incorporated herein by reference.

BACKGROUND OF THE INVENTION

1. Field of the Invention

The present invention relates to an apparatus for processing a sheet, which can determine kind, normal or damaged condition and truth or falsehood of the sheet such as banknote, and can sort the sheet based on the determined result. Further, the present invention relates to a method of inspecting the apparatus for processing a sheet, and to a test medium.

2. Description of the Related Art

In a conventional apparatus for processing a sheet, an operator (maintenance man) carries out the inspection of function and performance and the maintenance according to a guidebook such as manual, and thereby, the performance is secured. Usually, the maintenance man periodically carries out the inspection and maintenance of the apparatus for processing a sheet manually. In the inspection and maintenance of the apparatus for processing a sheet, the maintenance man reconfirms and repairs the operation of each unit in succession according to the guidebook.

However, there are many cases where the guidebook for the inspection and maintenance of the apparatus for processing a sheet does not always have clear description as to what to do given a particular set of circumstances. For this reason, in the conventional apparatus for processing a sheet, maintenance is performed based on the experience of the maintenance man. According to the above maintenance, the time spent for maintenance, or maintenance quality (maintenance level) is greatly different depending on the maintenance man's skill. As a result, the conventional apparatus has the following problem. That is, non-uniformity occurs in the maintenance level depending on the maintenance man's skill, and it is difficult to always keep constant function and performance.

BRIEF SUMMARY OF THE INVENTION

The present invention has been made in order to solve the above problem. Accordingly, it is an object of the present invention to provide an apparatus for processing a sheet, which can simply carry out stable maintenance and inspection, and can securely keep always-constant function and performance. Further, it is another object of the present invention to provide a method of inspecting the apparatus for processing a sheet, and to provide a test medium.

According to an aspect of the present invention, there is provided an apparatus for processing a sheet, which inspects a sheet, and processes the sheet based on the inspection result, comprising:

an insert section for inserting the sheet;

a conveying section for conveying the sheet inserted into the insert section;

a detecting section for detecting features from the sheet conveyed by the conveying section;

an inspection section for inspecting the sheet based on the features detected by the detecting section;

a judgment section for judging a condition of the apparatus from a medium having the features formed in a predetermined pattern conveyed by the conveying section based on the features detected by the detecting section when the medium is inserted into the insert section; and an information giving section for giving information on the judgment result by the judgment section.

According to another aspect of the present invention, there is provided a method of inspecting an apparatus for processing a sheet, which has an insert section for inserting the sheet, a conveying section for conveying the sheet inserted into the insert section, a detecting section for detecting features from the sheet conveyed by the conveying section, and an inspection section for inspecting the sheet based on the features detected by the detecting section, comprising:

conveying a medium by the conveying section, and detecting features from the medium by the detecting section when the medium having the features formed in a predetermined pattern is inserted into the insert section;

judging a condition of the apparatus based on the features detected by the detecting section from a medium conveyed by the conveying section; and giving information on the judgment result based on the judgment.

According to another aspect of the present invention, there is provided a test medium, which is used for an apparatus for processing a sheet having an insert section for inserting the sheet, a conveying section for conveying the sheet inserted into the insert section, a detecting section for detecting features from the sheet conveyed by the conveying section, and an inspection section for inspecting the sheet based on the features detected by the detecting section, the test medium comprising:

a shape conveyable by the conveying section; and a detection region compared with a predetermined reference value for judging the condition of the apparatus for processing a sheet, and having predetermined pattern features detectable by the detecting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIG. 8 is a view showing an image detection test pattern;

FIG. 9 is a graph showing a reference value and an allowable value with respect to a first image pattern;

FIG. 10 is a table showing the detection and judgment results of the first image pattern;

FIG. 11 is a table showing the detection and judgment results of a second image pattern;

FIG. 12 is a table showing the detection and judgment results of a third image pattern;

FIG. 13 is a view showing a thickness detection test pattern;

FIG. 14 is a view showing an output waveform as the thickness detection result;

DETAILED DESCRIPTION OF THE INVENTION

The embodiments of the present invention will be described below with reference to the accompanying drawings.

Figure 1:
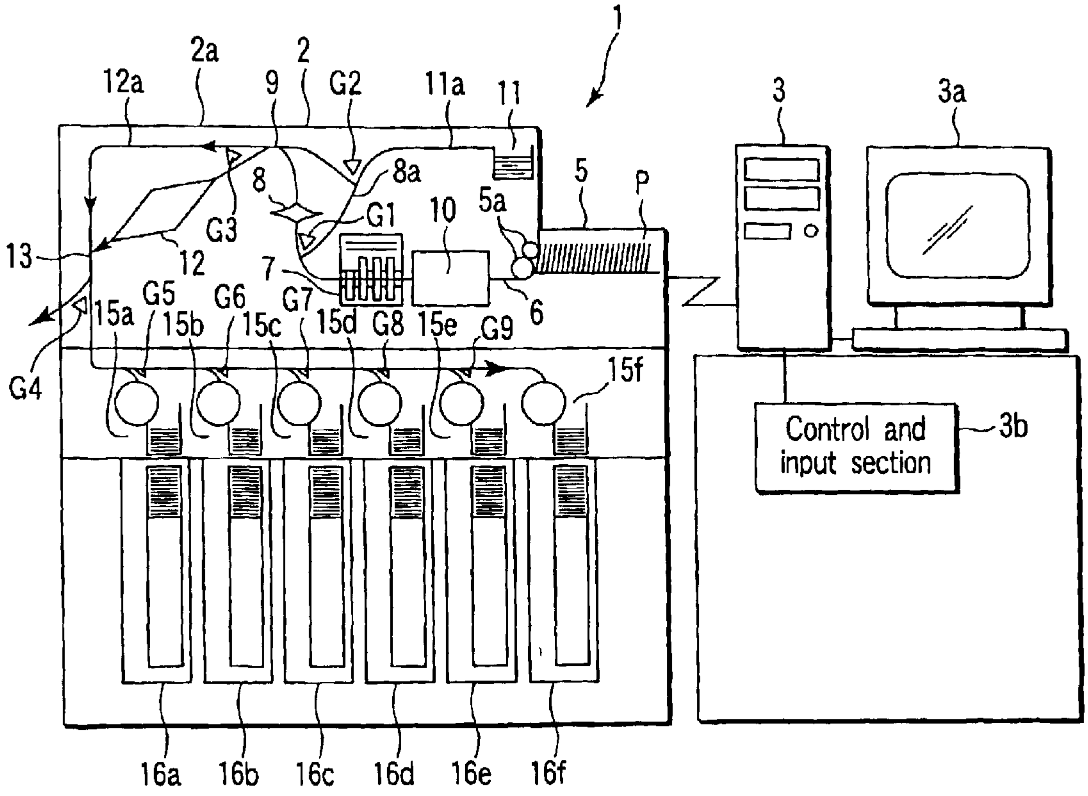
FIG. 1 is a view schematically showing the structure of a cash sorting machine according to an embodiment of the present invention.

FIG. 1 is a view schematically showing the structure of a banknote processor (apparatus for processing a sheet) 1 according to one embodiment of the present invention. As seen from FIG. 1, the banknote processor 1 comprises a banknote processing section 2 and a teller machine 3. Plural kinds of banknotes P (rectangular sheets) having different sizes are collectively mixed and inserted into the banknote processor 1. The banknote processor 1 normally arranges the obverse or reverse and direction of all banknotes P thus inserted, and sorts and collects them for each kind of banknote.

The banknote processing section 2 of the banknote processor 1 is connected with a personal computer (PC) 3, which is called a teller machine. The following control program, such as banknote sort designation, is installed on the PC 3. The control program is a program for collecting the banknote in the banknote processor main body 1 in any direction (i.e., regardless of the banknote orientation). In the banknote processor main body 1, the PC 3 presets the banknote sort designation.

A great many banknotes having different directions and kinds may be supplied into an insert section 5 of the main body 1. When the great many banknotes are supplied into the insert section 5, the main body 1 draws out the banknotes one by one by a draw-out unit 5*a* so that they can be properly arranged and positioned. When the banknotes are properly arranged and positioned, the main body 1 makes the judgment (discrimination) of the kind, the normal or damaged condition and the truth or falsehood of each banknote. Based on the above judgment result, the banknote processing section 2 collects the banknotes to a designated stack portion.

The PC 3 is connected with a monitor 3*a* (display section) and a control/input section 3*b* (mode select section). The monitor is used for displaying various information to the operator, and the control/input section 3*b* is used for accepting operator's various control/input operations. Further, the PC 3 has a function of storing count results of each processing batch, or the content of error and the reject data as log data.

The above banknote processing section 2 has an external box case 2*a* having a substantially rectangular shape. The upper portion on the right side of the case 2*a* is provided with an insert section 5 for collectively inserting many banknotes P in a state of collecting them in the surface direction and standing them in the latitudinal direction.

The insert section 5 positions all banknotes P so that their lower end side (one longer side) can be abutted against a stage along the longitudinal direction. Further, the insert section 5 moves a backup plate (not shown) to the surface direction of the banknote P along the stage. By doing so, in the insert section 5, the leftmost banknote P on the stage is pressed against a pair of draw-out rollers 5*a* (i.e., draw-out section). The pair of draw-out rollers 5*a* is vertically arranged at the left end of the stage. When the pair of draw-out rollers 5*a* is rotated, the banknote P on the stage is drawn out on a conveying path 6 in succession from the leftmost banknote.

A normally arranging section 10 is provided on the conveying path 6 just after the insert section 5. The normally arranging section 10 corrects any position defect of the banknote P in each processing section provided on the conveying path at the downstream side from the normally arranging section 10. More specifically, in order to prevent the disadvantage resulting from skew and shift of the banknote, the normally arranging section 10 corrects the skew and shift of each banknote P. A judgment and inspection unit 7 is arranged on the conveying path 6 just after the normally arranging section 10. The judgment and inspection section unit 7 detects features such as the kind, obverse or reverse, top and bottom (direction) and the presence of dirt or breakdown of the banknote P. The above judgment and inspection section unit 7 has a plurality of detecting sections. Each detecting section of the judgment and inspection section unit 7 detects various information (plural kinds of features) from the surface of the banknote P feeding on the conveying path 6. A plurality of gates G1 to G9 are provided on the conveying path 6 at the downstream side from the judgment and inspection section unit 7. The plurality of gates G1 to G9 selectively change the conveying direction of the banknote P based on the detection result by the judgment and inspection section unit 7.

A switchback mechanism 8 is provided on one conveying path branching from the position of the gate G1 arranged at the most upstream side. The switchback mechanism 8 reverses the conveying direction of the banknote P fed via the gate G1 so that the top and bottom of the banknote can be reversed, and thereafter, again feeds it onto the conveying path.

The other conveying path branching from the position of the above gate G1 is a contour conveying path 8*a* for conveying the banknote so as to contour the switchback mechanism 8. The conveying path 6 is set so that the banknote P passing the switchback mechanism 8 via the gate G1 and the banknote P passing the contour conveying path 8*a* reach a joining section 9 at the same time intervals.

The contour conveying path 8*a* branches into a reject conveying path 11*a* on the midway of the joining section 9. The gate G2 is provided at the position branching into the reject conveying path 11*a*. The terminal end of the reject conveying path 11*a* branching via the gate G2 is provided with a reject section 11 for rejecting the banknote P to be rejected.

For example, the banknote P to be rejected is a banknote, which is determined as incapable of being processed in the after-stage processing section of the judgment and inspection unit 7. Also, the banknote incapable of having its features detected in the judgment and inspection unit 7 is rejected into the reject section 11.

For example, the banknote P to be rejected may be a banknote, which is determined in the judgment and inspection unit 7 as two banknotes, a banknote, which is determined as having large skew beyond a predetermined level, or a banknote (damaged and falsehood note), which is not determined as being a re-circulating normal note.

In this case, the above reject section 11 is arranged above the insert section 5, and can be accessed from the outside of the case 2*a*.

The conveying path 6 of the downstream side from the joining section 9 again branches into two ways. The gate G3 is provided at the branch position on the conveying path 6 of the downstream side from the joining section 9. An obverse or reverse inverting mechanism 12 is provided on one conveying path branching at the position of the gate G3. The obverse or reverse inverting mechanism 12 has a twist conveying path, which twists by 180° around the center axis from the inlet toward the outlet. The twist conveying path serves to reverse the obverse or reverse of the passing banknote P. The other conveying path branching from the position of the above gate G3 is a contour conveying path 12*a* for conveying the banknote P so as to contour the obverse or reverse inverting mechanism 12. The conveying path 6 is set so that the banknote P passing the twist conveying path of obverse or reverse inverting mechanism 12 via the gate G3 and the banknote P passing the contour conveying path 12*a* reach a joining section 13 at the same time intervals.

The gate G4 is provided on the conveying path 6 on the further downstream side from the joining section 13. The conveying path branches into two ways by the gate G4. One of the two-way branching conveying paths is a horizontal conveying path 14, which extends substantially horizontally in the right-hand direction in FIG. 1. The horizontal conveying path 14 is provided with the remaining five gates G5 to G9 at approximately equal intervals. Six temporary reserving containers 15*a* to 15*f*, which is one more than the number of gates, are provided at the position branching downwardly from the horizontal conveying path 14 by each of the gates G5 to G9. Stackers 16*a* to 16*f* are provided above individual temporary reserving containers 15*a* to 15*f* in a one-to-one correspondence. The stackers 16*a* to 16*f* receive and accommodate the banknote collected to the temporary reserving container 15; in this case, the normally counted banknote has been reconfirmed.

The banknote P passing the joining section 13 selectively passes the above switchback mechanism 8 and/or obverse or reverse inverting mechanism 12. By doing so, the banknote P passing the joining section 13 is made even in its obverse or reverse and its top and bottom (direction). Therefore, the banknote P collected in the temporary reserving containers 15*a* to 15*f* is collected into each predetermined temporary reserving container in a state of being made even in its obverse or reverse and its top and bottom (direction).

Figure 2:
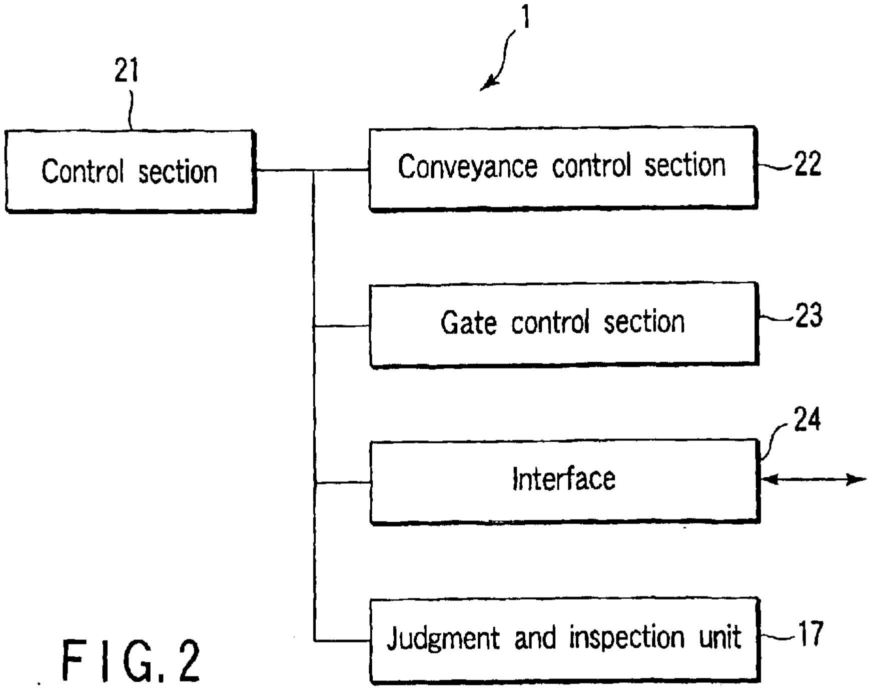
FIG. 2 is a block diagram schematically showing the configuration of a control system in the cash sorting machine of FIG. 1.

FIG. 2 is a block diagram showing the configuration of a control system of the sheet processing section 2.

As shown in FIG. 2, the sheet processing section 2 is provided with a control section 21 for controlling the entire system. The control section 21 is connected with a conveyance control section 22, a gate control section, an interface 24, and the above judgment and inspection unit 7.

The conveyance control section 22 controls the conveyance of the banknote by each conveying path in the sheet processing section 2. The gate control section 23 controls the drive of the gates G1 to G9 based on the judgment result of the kind of the banknote by the judgment and inspection unit 7. The interface 24 makes the exchange of data with the above teller machine 3.

The banknotes set in the insertion section 5 are drawn out one by one. Thereafter, they are conveyed to the conveying path 6, thereby, passing the judgment and inspection unit 7. The judgment and inspection unit 7 judges the kind of the banknote, direction, normal or abnormal banknote, and a degree of dirt or damage. The judgment result by the judgment and inspection unit 7 is supplied to the control section 21. Based on the judgment result, the control section 21 controls the drive of the gates G1 to G9 by the gate control section 23. By doing so, the banknote is sorted to each temporary reserving container.

Figure 3:
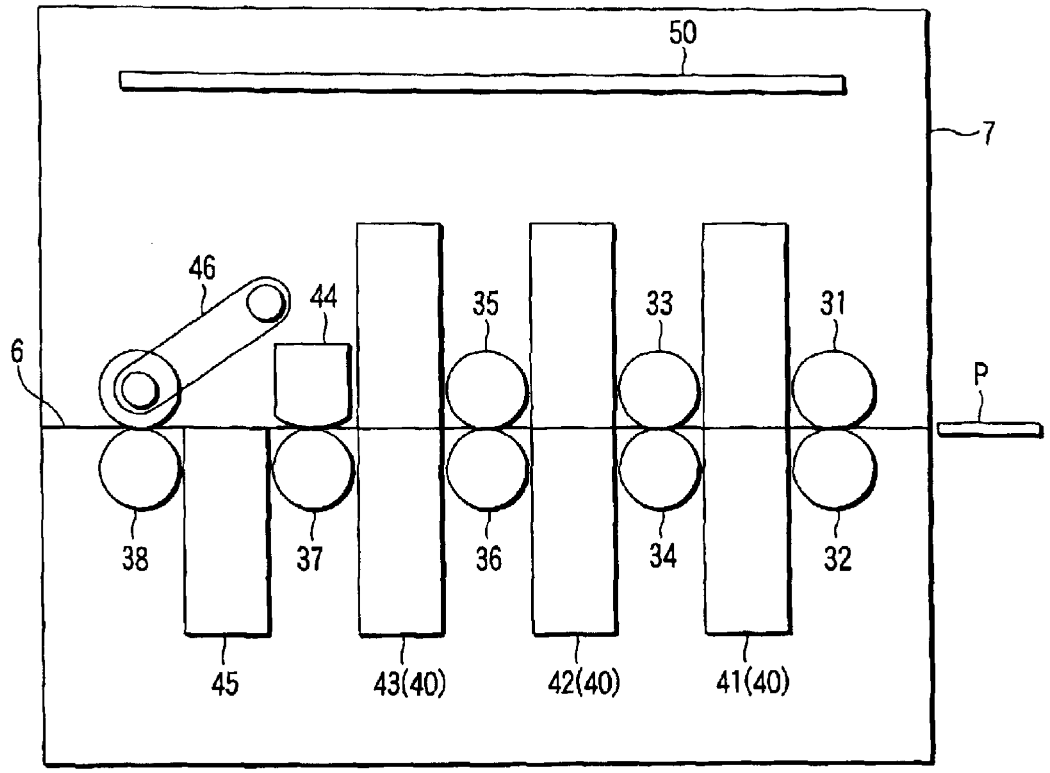
FIG. 3 is a view schematically showing the internal structure of a judgment unit.

FIG. 3 is a view showing the structure of the judgment and inspection unit 7.

As illustrated in FIG. 3, in the judgment and inspection unit 7, the banknote P is conveyed into the clearance on the conveying path P from the right to the left hand (as shown in FIG. 3) via conveying rollers 31 to 38. On the conveying path 6, a transmission image detecting section 41, an upper surface reflection image detecting section 42, a lower surface reflection image detecting section 43, a magnetic detecting section 44, a fluorescent detecting section 45 and a thickness detecting section 46 are arranged in succession from the right side of FIG. 3 to the left side.

The transmission image detecting section 41 detects the transmission image information of the sheet S. The upper surface reflection image detecting section 42 detects the reflection image information of the upper surface of the sheet S. The lower surface reflection image detecting section 43 detects the reflection image information of the lower surface of the sheet S. The magnetic detecting section 44 detects the magnetic printing characteristics of the sheet S. The fluorescent detecting section 45 detects an amount of fluorescent omission features from the sheet S. The thickness detecting section 46 detects a thickness of the sheet.

The above transmission image detecting section 41 is interposed between the conveying roller couple 31, 32 and the conveying roller couple 33, 34. The upper surface reflection image detecting section 42 is interposed between the conveying roller couple 33, 34 and the conveying roller couple 35, 36. The lower surface reflection image detecting section 43 is interposed between the conveying roller couple 35, 36 and a conveying roller 37. The magnetic detecting section 44 is arranged at the opposite position via the conveying path 6 of the conveying roller 37. The fluorescent detecting section 45 is interposed between the conveying rollers 37 and 38. The thickness detecting section 45 is arranged at the opposite position via the conveying path 6 of the conveying roller 38 (stationary roller).

A judgment and inspection processor 50 is provided above in the judgment and inspection unit 7. The judgment and inspection processing section 50 judges the kind of the banknote, direction (obverse or reverse), normal or abnormal banknote, and a degree of dirt or damage. Further, the judgment and inspection processor 50 is connected with the above-mentioned transmission image detecting section 41, upper surface reflection image detecting section 42, lower surface reflection image detecting section 43, magnetic detecting section 44, fluorescent detecting section 45 and thickness detecting section 46.

The following is a description of the configuration of the control system of the above judgment and inspection unit 7.

Figure 4:
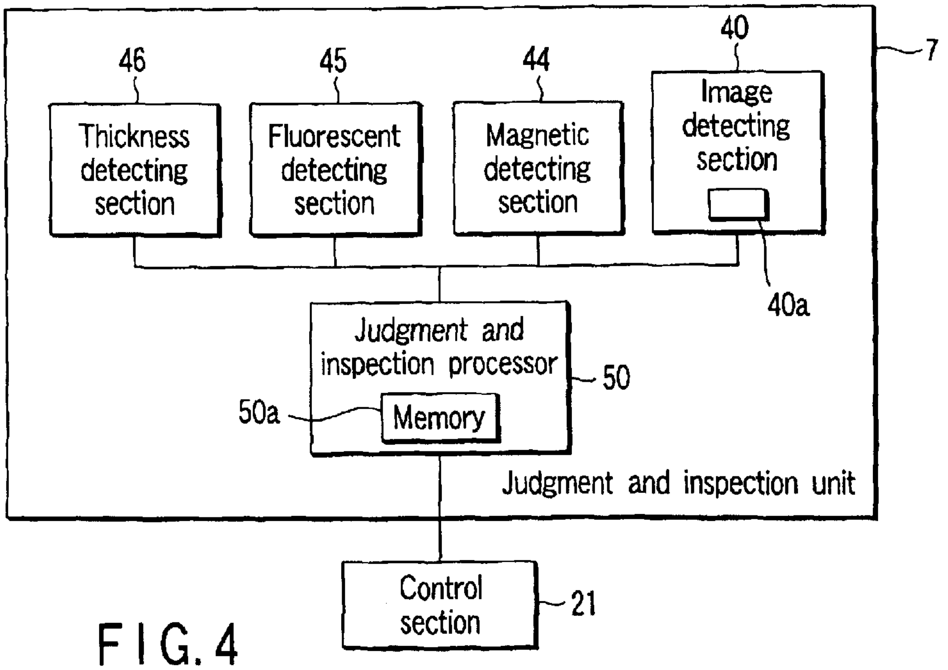
FIG. 4 is a block diagram schematically showing the configuration of a control system in the judgment unit of FIG. 3.

FIG. 4 is a block diagram showing the configuration of the judgment and inspection unit 7. As seen from FIG. 4, in the judgment and inspection unit 7, the judgment and inspection processor 50 is connected with the above-mentioned transmission image detecting section 41, upper surface reflection image detecting section 42, lower surface reflection image detecting section 43, magnetic detecting section 44, fluorescent detecting section 45 and thickness detecting section 46.

The above transmission image detecting section 41, the upper surface reflection image detecting section 42 and the lower surface reflection image detecting section 43 each comprises a light emitting section and a light receiving section. For example, the light emitting section comprises a LED array. Visible rays and near-infrared rays are used as the above LED in accordance with the usage. The light receiving section comprises a photo diode array or a CCD (Charged Coupled Device). The above light emitting and receiving sections function as a one-dimensional image detecting section.

The upper and lower surface reflection image detecting sections 42 and 43 are provided with a white reference section (not shown) for determining white reference at one end of the read position of the image detecting section. Further, the upper and lower surface reflection image detecting sections 42 and 43 correct a read image based on the read image of the white reference section by a shading correcting section 40*a*. In the following description, the above transmission image detecting section 41, the upper and lower surface reflection image detecting sections 42 and 43 will be explained as an image detecting section 40.

The magnetic detecting section 44 detects characters and patterns printed by magnetic ink from the conveyed banknote. For example, the magnetic detecting section 44 comprises a magnetic sensor such as magnetic head. The magnetic detecting section 44 is configured to applying a direct bias current to a primary side coil of core material of the magnetic head, and to detect a change of magnetic flux when magnetic material passes the magnetic head by a secondary side coil.

The fluorescent emitting detecting section 45 detects design printed by fluorescent emitting ink from the conveyed banknote. The fluorescent emitting detecting section 45 is composed of a light emitting section and a light receiving section. For example, the light emitting section of the fluorescent emitting detecting section 45 comprises an ultraviolet emitting lamp. The light receiving section of the fluorescent emitting detecting section 45 detects the light emitted from the banknote by a photo diode with spot field of view.

The thickness detecting section 46 detects a thickness of the conveyed banknote. The thickness detecting section 46 outputs the thickness of the banknote as a voltage value. The thickness detecting section 46 is configured to put the banknote between two rollers, and to convert a change of the one roller or the shaft supporting the roller into an electric signal by a displacement detecting section.

The judgment and inspection processor 50 judges the kind, normal or damaged condition and truth or falsehood of the banknote based on the features detected by the above detecting sections 41 to 46. Further, the judgment and inspection processor 50 has a memory 50*a*, which stores a reference value for judging the features obtained by the above detecting sections 41 to 46.

Figure 5:
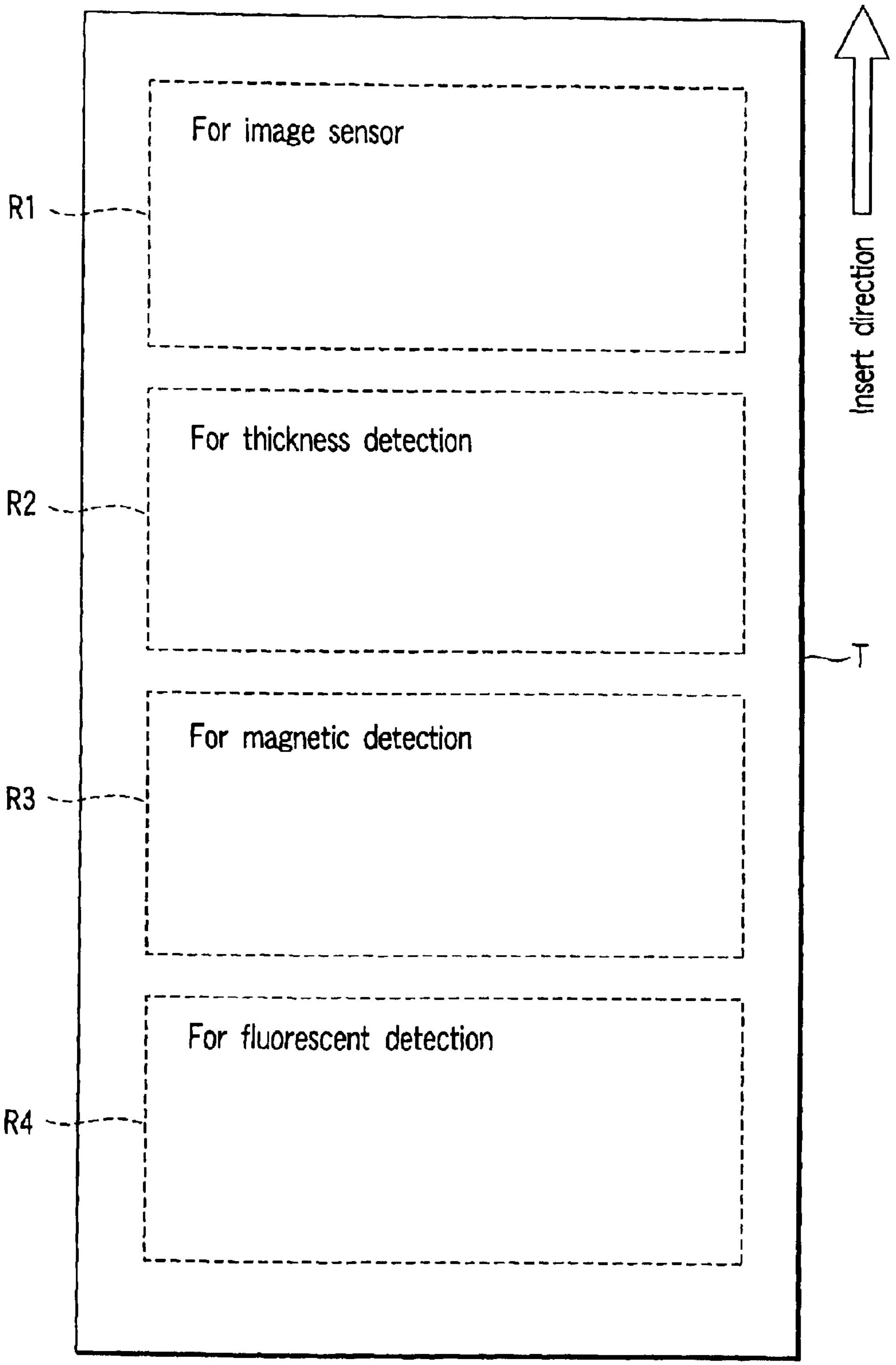
FIG. 5 is a view schematically showing a configuration of a test card.

FIG. 5 is a view showing a test card (test medium) T used for the maintenance of the judgment and inspection unit 7. As shown in FIG. 5, the test card T is provided with regions R1 to R4. The region R1 is formed with a test pattern for making the inspection of the image detecting section 40. The region R2 is formed with a test pattern for making the inspection of the thickness detecting section 46. The region R3 is formed with a test pattern for making the inspection of the magnetic detecting section 44. The region R4 is formed with a test pattern for making the inspection of the fluorescent detecting section 45. The image detecting section 40 comprises the upper surface image detecting section 42 and the lower surface image detecting section 43; for this reason, the test pattern of the region R1 at least is printed on the double sides of the test card T.

Figure 6:
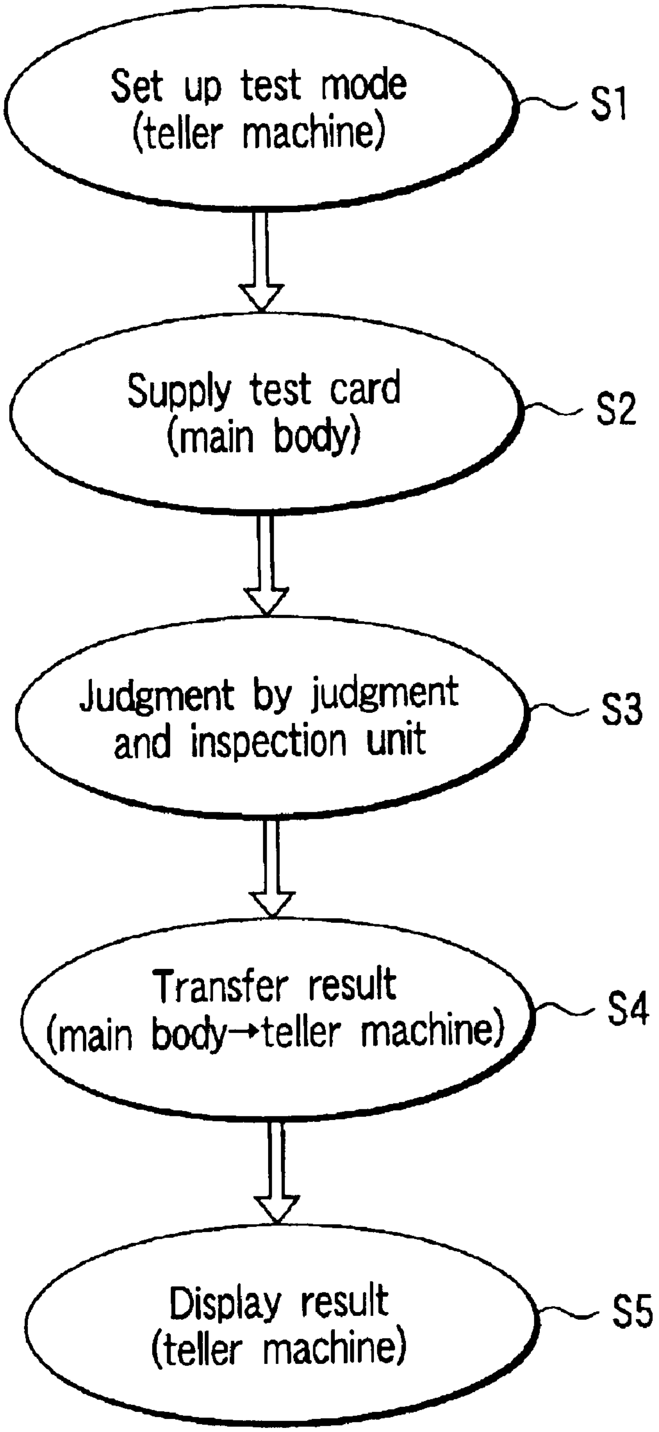
FIG. 6 is a flowchart to schematically explain a test mode operation.

The maintenance operation of the judgment and inspection unit 7 will be explained below. FIG. 6 is a flowchart to explain the entire flow in the maintenance operation.

First, when carrying out the maintenance of the judgment and inspection unit 7, the operator (maintenance man) sets up a maintenance mode (test mode) input by the teller machine 3 (step S1). The teller machine 3 requests a test mode operation setup to the banknote processing section 2 based on the setup inputted by the operator. When receiving the test mode operation setup request, the control section 21 of the banknote processing section 2 executes the test mode operation setup. By the above operation setup, the banknote processing section 2 is capable of recognizing the above test card T.

When the test mode operation setup is completed, the operator sets the test card T on the insert section 5, and makes a count start operation from the teller machine. In accordance with the above operation, the teller machine 3 requests the test mode start with respect to the banknote processing section 2. When receiving the test mode start request, the control section 21 of the banknote processing section 2 accepts the test card T set in the insert section 5 by the conveyance control section 22.

The test card T accepted in the banknote processing section 2 from the insert section 5 is arranged and positioned by the normally arranging section 10, thereafter, supplied to the judgment and inspection unit 7. When the test card T is supplied, in the judgment and inspection unit 7, the detecting sections 40 to 46 read informations on the regions R1 to R4 formed in the test card T. More specifically, in the judgment and inspection unit 7, the image detecting section 40 reads the region R1 of the test card T, and the thickness detecting section 46 reads the region R2 of the test card T. Further, the magnetic detecting section 44 reads the region R3 of the test card T, and the fluorescent detecting section 46 reads the region R4 of the test card T.

In the judgment and inspection unit 7, the information read by the detecting sections 40 to 46 is supplied to the judgment and inspection processor 50. The judgment and inspection processor 50 compares the information (detection results) read by the detecting sections 40 to 46 with the reference value previously stored in the memory 50*a*. Based on the comparative result, the judgment and inspection processor 50 supplies the result information such as the difference between the detection result and the reference value, to the teller machine 3.

If the difference exceeds a predetermined reference difference (allowable range), the judgment and inspection processor 50 supplies the result to the teller machine 3 inclusive of maintenance information such as component exchange information. The teller machine 3 displays the judgment result supplied from the banknote processing section 2 on the display section 3*a*.

Thus, the operator can recognize the operating state of the banknote processor, and perform the maintenance work of the banknote processor according to the information displayed on the display section 2*a*.

The following is a detailed description of the method (maintenance) of reconfirming the function and performance of each detecting section of the judgment and inspection unit 7.

First, the maintenance of the image detecting section 40 will be described. The function and performance of the image detecting section 40 are tested based on the image information reading the region R1 of the test card T.

FIG. 8 is a view showing an image detecting section test pattern (image detected pattern) T1 printed on the region R1 of the test card T. The image detecting section test pattern T1 printed on the region R1 is a test pattern for inspecting the image detection state by the image detecting section 40.

More specifically, in maintenance, the image detecting section 40 reads the image detection pattern T1 of the region R1 so that the read image data can be compared with a predetermined reference value, and thereby, the condition of the image detecting section 40 can be determined.

Figure 7:
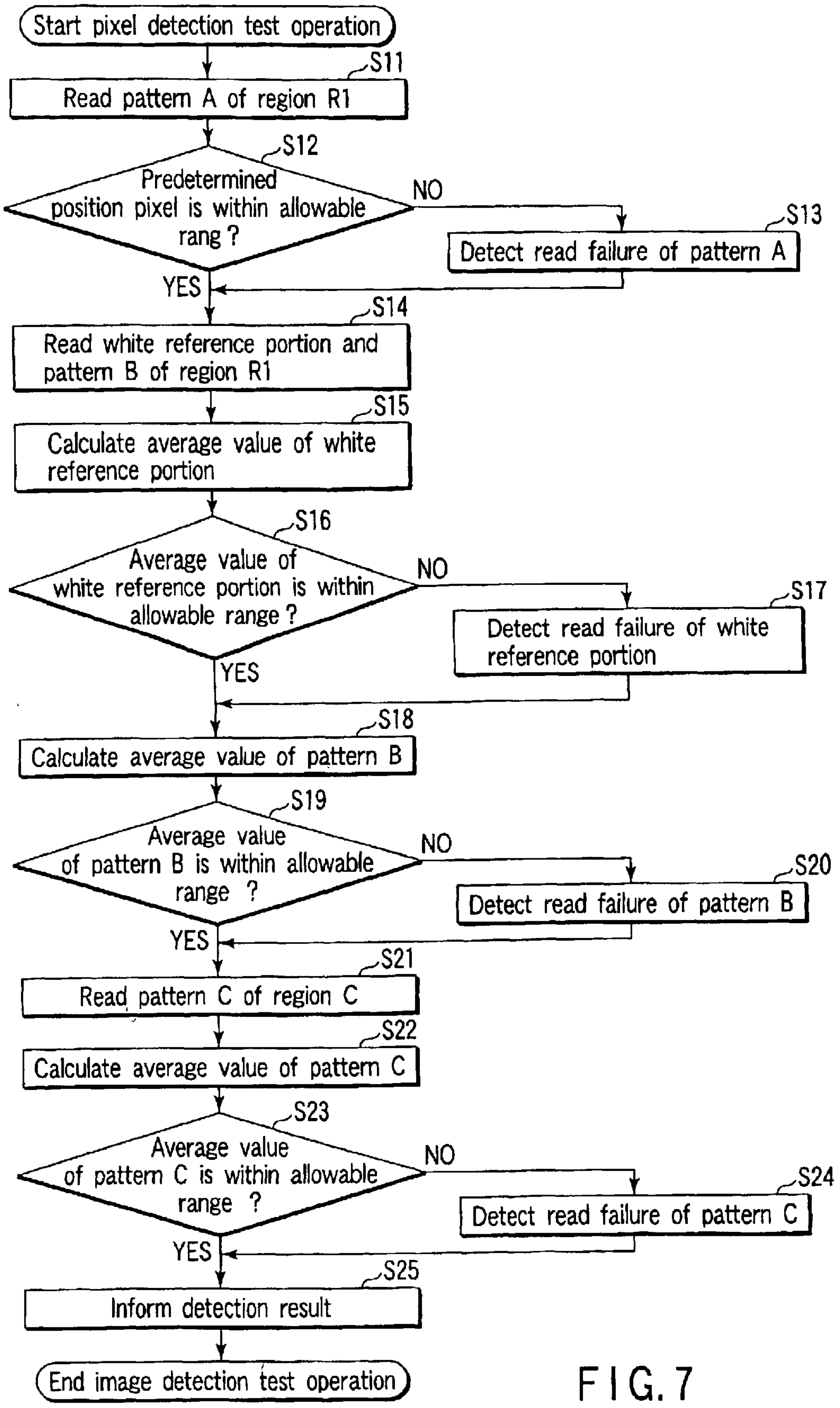
FIG. 7 is a flowchart to explain a test operation of an image detecting section.

As seen from FIG. 7, the image detection pattern formed in the region R1 of the test card T is formed of three image patterns A, B and C. The first image pattern A has a white center portion and black opposite ends, and the portion from the center portion to the opposite ends becomes gradually black. The second image pattern B is a white pattern (white image), all of which is white. The third image pattern C is a black pattern (black image), all of which is black.

The test operation of the image detecting section 40 using the image detection pattern T1 will be described below with reference to a flowchart shown in FIG. 7.

When the test card T is conveyed and the region R1 reaches the read position of the image detecting section 40, the image detecting section 40 reads and scans the region R1 of the test card T on which the image detection pattern T1 is printed.

By doing so, the image detecting section 40 successively reads the images of the first to third image patterns A to C. In this case, when reading the second image pattern, the image detecting section 40 also reads the white reference portion provided at one end of the read position of the image detecting section 40.

The images read from the individual patterns are supplied in succession to the judgment and inspection processor 50. The judgment and inspection processor 50 detects a read failure of the image detecting section 40 based on the read image of each pattern. Here, it is considered that the factor of the read failure is non-uniformity of sensitivity of the image sensor constituting the image detecting section 40, non-uniformity of sensor bit, or physical dirt.

When reading the above first image pattern A (step S11), the judgment and inspection processor 50 determines whether or not a density value of the read pixel (image) is normal with respect to plural density value of the images. That is, the judgment and inspection processor 50 determines whether or not the density value of the read image at plural positions on the first image pattern A is within the allowable range previously stored in the memory 50*a* (step S12).

FIG. 9 is a graph showing the preset reference value of the first image pattern A, and an allowable range with respect to the reference value at predetermined each point on the first image pattern A.

In FIG. 9, there is shown an allowable range of the read value (measured value) at plural position on the first image pattern A. The allowable range with respect to the read value (read pixel value) represents the difference allowable with respect to the reference value. Therefore, if the read value by the image detecting section 40 is within the allowable range (step S12, YES), the judgment and inspection processor 50 determines that the read value by the image detecting section 40 is normal.

FIG. 10 is a table showing measured values, allowable ranges and judgment results at plural positions on the first image pattern A.

As seen from FIG. 10, for example, in a point P1 on the first image detection pattern A, the measured value is 10, and the allowable range is 0 to 20. The measured value is within the allowable range; therefore, the judgment result is normal. In this case, the point P1 is the end portion of the first image detection pattern A, and thus, has the density near to black. Likewise, it is determined whether or not the read pixel density of the points P2, P3, . . . , is within the predetermined allowable range with respect to the predetermined reference value.

If the read pixel value is out of the allowable range (step S12, NO), the judgment and inspection processor 50 determines that the read value is abnormal, and detects the read failure of the read image by the pattern A (step S13).

The above judgment results are displayed on the display section 3*a* of the teller machine 3 via the control section 21. Therefore, the operator can securely and effectively perform the maintenance work of the image detecting section 40.

When reading the above white reference portion and the second image pattern (white image) B (step S14), the judgment and inspection processor 50 calculates each read pixel average value of the white reference portion and the second image pattern B (step S15, S18). Then, it is determined whether or not each average value is within the allowable range previously stored in the memory 50*a*, and thereby, it is determined whether or not the read value is normal (step S16, S19).

That is, the judgment and inspection processor 50 determines whether or not the average value of the read pixel of the white reference portion is within the predetermined allowable range (step S16). From the judgment, if the average value of the read pixel of the white reference portion is within the predetermined allowable range (step S16, YES), the judgment and inspection processor 50 determines that the read by the image detecting section 40 with respect to the white reference portion is normal.

From the judgment of step S16, if the average value of the read pixel of the white reference portion is out of the predetermined allowable range (step S16, NO), the judgment and inspection processor 50 determines that the read by the image detecting section 40 with respect to the white reference portion is abnormal (step S17).

Further, the judgment and inspection processor 50 determines whether or not the average value of the read pixel of the second image pattern B is within the predetermined allowable range (step S19). From the judgment, if the average value of the read pixel of the white reference portion is within the predetermined allowable range (step S19, YES), the judgment and inspection processor 50 determines that the read by the image detecting section 40 with respect to the second image pattern B is normal.

From the judgment of step S19, if the average value of the read pixel is out of the predetermined allowable range (step S19, NO), the judgment and inspection processor 50 determines that the read by the image detecting section 40 with respect to the second image pattern B is abnormal (step S20).

For example, if the average value of the second image pattern B is out of the allowable range, the judgment and inspection processor 50 determines that the image sensor reading the image has poor sensitivity, or is dirty (i.e., fouled with dirt). If the average value of the white reference portion is out of the allowable range, the judgment and inspection processor 50 determines that the image sensor of the corresponding portion has poor sensitivity, or the white reference portion is dirty (i.e., fouled with dirt).

The above judgment result is displayed on the display section 3*a* of the teller machine 3 via the control section 21. Therefore, the operator can simply see which portion should be adjusted or cleaned.

If both average values of the image pattern B and the white reference portion are out of the allowable range, the judgment and inspection processor 50 determines that there is a possibility that the correction by the shading correcting section 40*a* is not suitably made. For this reason, when both average values of the image pattern B and the white reference portion are out of the allowable range, the judgment and inspection processor 50 can display a message that shading correction should be retried, on the display section 3*a*. By doing so, the adjustment of the shading correcting section 40*a* can be effectively made.

FIG. 11 is a table showing the average value, allowable range and judgment result of the read pixel of the second image pattern B and the average value, allowable range and judgment result of the read pixel of the white reference portion, with respect to the read pixel data on the second image pattern B.

As seen from FIG. 11, first, the average value with respect to the read pixel data of the second image pattern B is C0, and the allowable value is B8 to DF. As a result, the average value is within the allowable value; therefore, the judgment result is normal.

The average value with respect to the read pixel data of the white reference portion is BF, and the allowable value is B0 to D0. As a result, the average value is within the allowable value; therefore, the judgment result is normal. In this case, if the average value of the read pixel of the image pattern B or the white reference portion are out of the allowable range, the judgment and inspection processor 50 determines that the read pixel with respect to the white image or the white reference of the image detecting section 40 is abnormal.

When the image detecting section 40 read the third image pattern C (step S21), the judgment and inspection processor 50 determines whether or not the read pixel with respect to the third image pattern C (black image) is normal.

More specifically, the judgment and inspection processor 50 calculates an average value of the read pixel of the third image pattern C (step S22). Thereafter, it determines whether or not the calculated average value of the third image pattern C is within an allowable range previously stored in the memory 50*a* (step S23).

From the judgment, if the average of the read pixel of the third image pattern C is within the allowable range (step S23, YES), the judgment and inspection processor 50 determines that the read by the image detecting section 40 with respect to the black image is normal.

If the average of the read pixel of the third image pattern C is out of the allowable range (step S23, NO), the judgment and inspection processor 50 detects a read failure by the image detecting section 40 with respect to the black image.

FIG. 12 is a table showing the average value, allowable range and judgment result of the read pixel by the image detecting section 40 with respect to the read pixel data on the third image pattern C.

As seen from FIG. 12, the average value with respect to the read pixel data of the third image pattern C is 10, and the allowable value is 0 to 20. As a result, the average value is within the allowable value; therefore, the judgment result is normal. In this case, if the average of the read pixel of the third image pattern C is out of the allowable range, the judgment and inspection processor 50 determines that the read pixel by the image detecting section 40 with respect to the black image is abnormal.

The judgment and inspection processor 50 gives the judgment results of the above steps S11 to S24 to the control section 21 (step S25). The control section 21 makes the comprehensive judgment inclusive of the test operation result of the detection sections, and supplies the judgment results to the teller machine 3 via the interface 24. By doing so, the teller machine 3 displays the judgment results on the display section 3*a*, so that a message relevant to the operating state of the banknote processor can be given to the operator.

As described above, in the judgment and inspection unit, the image detecting sections read the test pattern printed on the test card. The judgment and inspection processor compares the pixel read by the image detecting sections with the predetermined reference value. Based on the comparative result, the judgment and inspection processor determines whether or not the read pixel of the image detecting section is normal. The judgment result is given to the operator via the display section. Further, based on the judgment result, shading correction is retried.

By doing so, it is possible to readily and securely perform the maintenance of the judgment and inspection unit or the image detecting section. Further, three different patterns are read so that the inspection can be carried out, and thereby, it is possible to expect that maintenance should be carried out with respect to which portion of the image detecting section. Therefore, the operator can effectively perform the maintenance work.

The maintenance of the thickness detecting section 46 will be described below.

The thickness detecting section 46 detects the thickness of the region R2 of the test card T, and thereby, its function, performance and operating state are tested.

FIG. 13 is a view showing a thickness detection test pattern (thickness detection pattern) T2 detected by the thickness detecting section 46. The thickness detection pattern T2 is formed in the region R2 of the test card T. The thickness detection pattern T2 formed in the region R2 is a solid pattern for inspecting the operating state of the thickness detecting section 46.

More specifically, in maintenance, the thickness detecting section 46 detects the thickness of the thickness detection pattern T2 formed in the region R2. The detected thickness is compared with an allowable range previously stored in the memory 50*a,* and thereby, the operating state of the thickness detecting section 46 is determined.

As is illustrated in FIG. 13, the thickness detection pattern T2 formed in the region R2 of the test card T is formed of solid thickness patterns D, E and F having three kinds of thickness. As shown in FIG. 13, when the thickness of a sheet of banknote is set as t (e.g., about 100 $\mu$m), the first thickness pattern D is equal to the thickness t of the sheet of banknote. The second thickness pattern E has a thickness 2 t of two sheets of banknote, and the third thickness pattern E has a thickness 3t of three sheets of banknote.

The above thickness detecting section 46 comprises a sensor, which detects the thickness of the conveyed banknote using a voltage value. Thus, as is illustrated in FIG. 14, the thickness detecting section 46 outputs voltage values in accordance with the thickness. Therefore, it is important for the thickness detecting section 46 to keep the performance (detection output) capable of accurately determining whether the banknote is one or two banknotes (i.e., more than one banknote).

The test operation of the thickness detecting section 46 using the thickness detection pattern T2 will be described below with reference to a flowchart shown in FIG. 15.

When the test card T is conveyed and the region R2 of the test card passes the thickness detecting section 46, the thickness detecting section 46 successively detects thickness patterns D, E and F of the region R2 of the test card T, thereafter, converts the thickness into a voltage value (step S31). The thickness detection result of the region R2 is detected as a voltage waveform shown in FIG. 14.

For example, if the voltage waveform shown in FIG. 14 is obtained, the detection result of the first thickness pattern D is a voltage Vd. The detection result of the second thickness pattern E is a voltage Ve, and the detection result of the third thickness pattern F is a voltage Vf.

Figure 16:
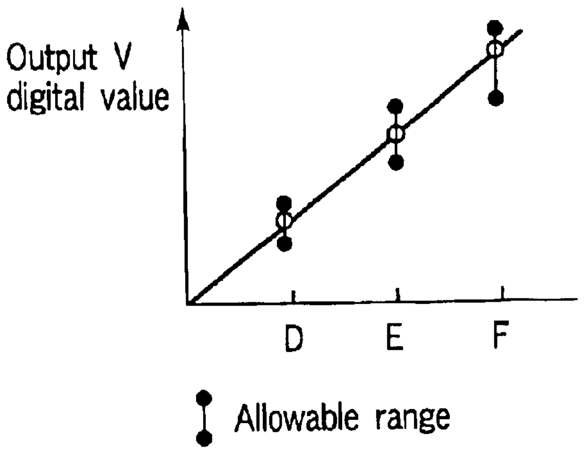
FIG. 16 is a graph showing a reference value and an allowable value with respect to the thickness detection test pattern.

The judgment is made whether or not the voltage values Vd, Ve and Vf are within a predetermined allowable range as shown in FIG. 16, and thereby, the judgment and inspection processor 50 determines whether or not the above thickness detecting section 46 is normal.

That is, the judgment and inspection processor 50 determines whether or not the voltage Vd as the detection result of the first thickness pattern D is within the allowable range previously stored in the memory 50*a* (step S32).

From the above judgment, if it is determined that the voltage Vd is within the allowable range (step S32, YES), the judgment and inspection processor 50 determines that the thickness detection of one sheet of banknote is normal.

From the judgment in step S32, if it is determined that the voltage Vd is out of the allowable range (step S32, NO), the judgment and inspection processor 50 detects that the thickness detection of one sheet of banknote is abnormal (step S33).

Likewise, the judgment and inspection processor 50 determines whether or not the voltage Vf, as the detection result of the second thickness pattern F, is within the allowable range previously stored in the memory 50*a* (step S34).

From the above judgment, if it is determined that the voltage Ve is within the allowable range (step S34, YES), the judgment and inspection processor 50 determines that the thickness detection of two sheets of banknote is normal.

From the judgment of the above step S34, if it is determined that the voltage Ve is out of the allowable range (step S34, NO), the judgment and inspection processor 50 determines that the thickness detection of two sheets of banknote is abnormal (step S35).

Likewise, the judgment and inspection processor 50 determines whether or not the voltage Vf, as the detection result of the third thickness pattern F, is within the allowable range previously stored in the memory 50*a* (step S36).

From the judgment, if it is determined that the voltage Vf is within the allowable range (step S36, YES), the judgment and inspection processor 50 determines that the thickness detection of three sheets of banknote is normal.

From the judgment of the above step S36, if it is determined that the voltage Vf is out of the allowable range (step S36, NO), the judgment and inspection processor 50 determines that the thickness detection of three sheets of banknote is abnormal (step S37).

Figure 15:
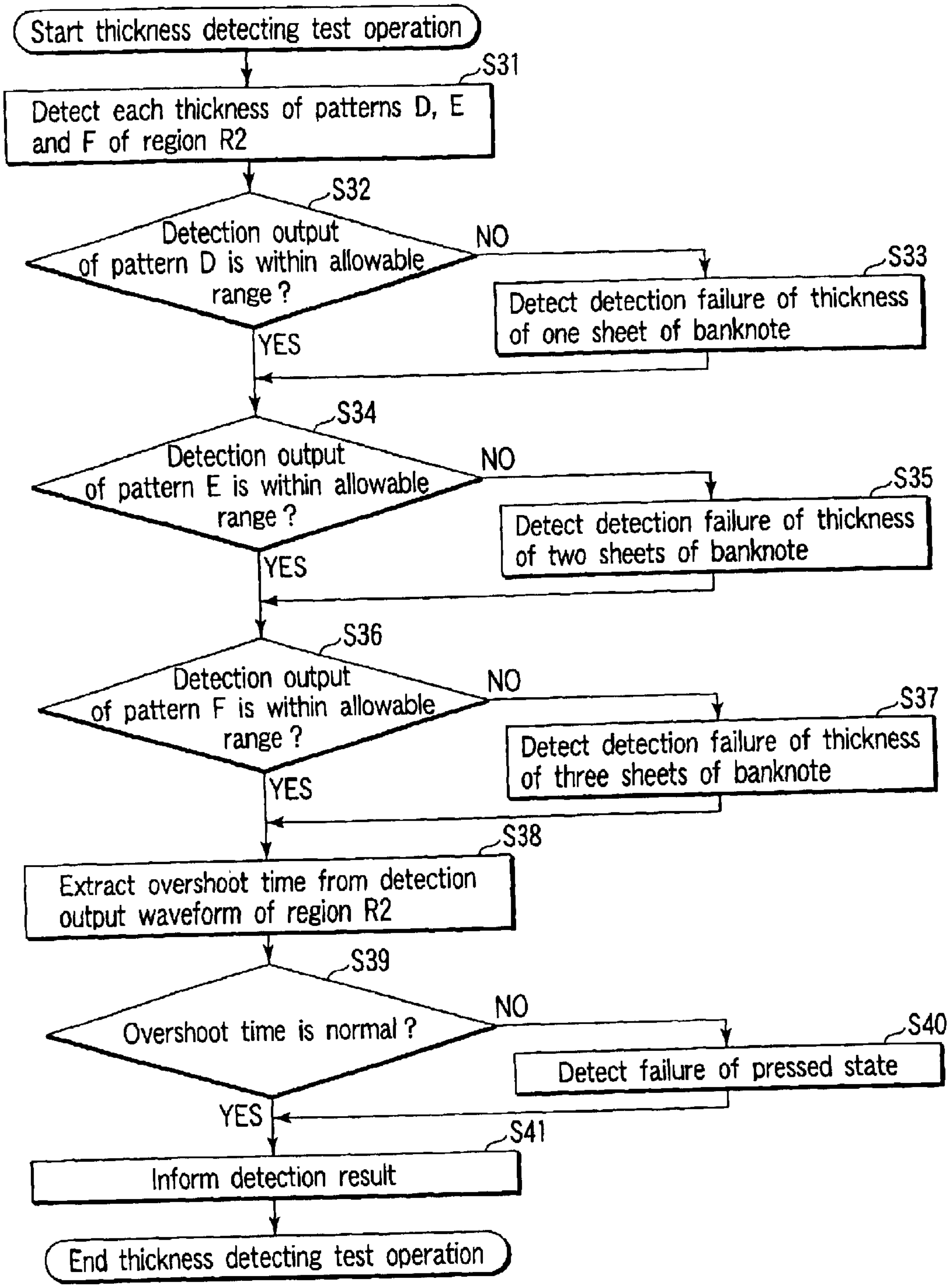
FIG. 15 is a flowchart to explain a test operation of a thickness detecting section.

In the judgment and inspection processor 50, as shown in FIG. 15, the time of overshoot S is extracted from the detection voltage waveform of the region R2 (step S38). The overshoot S is waveform disturbance generated when a conveying object having a thickness intrudes into the thickness detecting section 46.

Namely, when the conveying object passes between the thickness sensor and the stationary conveying roller (fixed roller) 38 existing at the position opposite to the thickness sensor, the thickness detecting section 46 detects the voltage value in accordance with the thickness. For this reason, the thickness sensor and the stationary roller 38 are pressed against each other. Therefore, when the conveying object passes between the thickness sensor and the stationary conveying roller 38, which are in a state of being pressed against one another, the thickness sensor jumps up more than the actual thickness of the conveying object; as a result, overshoot S is generated.

Consequently, the state of the overshoot S is detected, and thereby, it is possible to check the pressed state between the thickness sensor and the stationary roller 38. In this case, it is determined whether or not the pressed state is abnormal in accordance with an average value of time when the overshoot S is generating.

That is, when the time of the overshoot S is extracted, the judgment and inspection processor 50 determines whether or not the time of the overshoot S is within a predetermined allowable range (step S39).

From the above judgment, if it is determined that the time of the overshoot S is within the allowable range (step S39, YES), the judgment and inspection processor 50 determines that the pressed state is normal (step S40).

From the judgment of the above step S39, if it is determined that the time of the overshoot S is out of the allowable range (step S39, NO), the judgment and inspection processor 50 detects the failure of the pressed state (step S40).

The judgment and inspection processor 50 gives judgment results of steps S31 to S40 to the control section 21 (step S41).

The control section 21 makes the comprehensive judgment inclusive of the test operation results of other detecting sections, as the need arises, thereafter, gives the judgment result to the teller machine 3 via the interface 24.

Thus, the teller machine 3 displays the above judgment result on the display section 3*a* so that the operator can see it.

As described above, the solid patterns formed on the test card are detected, and based on the detected output waveform, it is possible to check the linearity or the pressed state of the thickness sensor. Many thickness sensors are arranged in parallel; in this case, the detection output value of each sensor is checked, and thereby, it is possible to know whether the sensors have failed individually or in common.

The following is a description of the maintenance of the magnetic detecting section 44.

The magnetic detecting section 44 reads magnetic information of the region R3 on the test card T, and thereby, its function, performance and operating state are tested.

Figure 17:
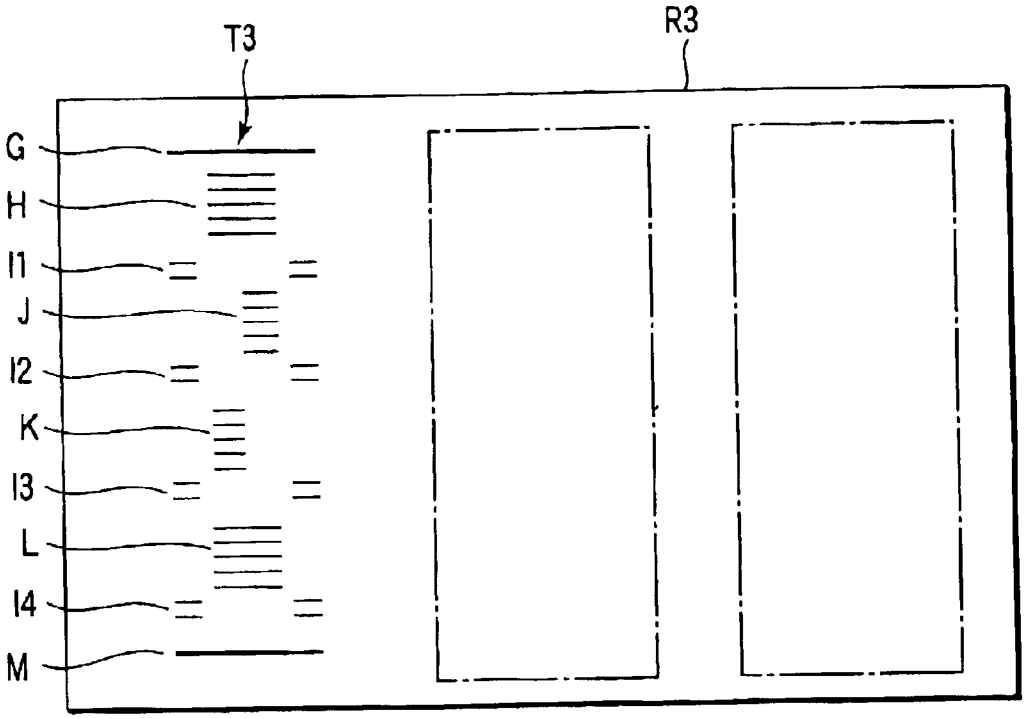
FIG. 17 is a view showing a magnetic detection test pattern.

FIG. 17 is a view showing a magnetic detection test pattern (magnetic detection pattern) T3 detected by the magnetic detecting section 44. The magnetic detection pattern T3 is formed on the region R3 of the test card T. The magnetic detection pattern T3 formed on the region R3 is a magnetic information pattern for checking a state of the magnetic detecting section 44.

More specifically, in maintenance, the magnetic detecting section 44 detects magnetic information from the magnetic detection pattern T3 formed on the region R3 of the test card T, and outputs the detected magnetic information to the judgment and inspection processor 50. The judgment and inspection processor 50 compares the magnetic information detected by the magnetic detecting section 44 with a predetermined reference value, and thereby, determines the state of the magnetic detecting section 44.

The above magnetic detecting section 44 comprises a plurality of magnetic heads. In the magnetic heads, a current carries in accordance with magnetic information on a medium conveyed at a predetermined conveying speed. The magnetic detecting section 44 converts a current carrying to each magnetic head into a voltage, and thereby, detects the magnetic information as a voltage value. Further, the magnetic detecting section 44 outputs the magnetic information detected using each magnetic head to the judgment and inspection processor 50.

For example, each magnetic head of the magnetic detecting section 44 detects characters or patterns on the banknote printed by magnetic ink as magnetic information, and outputs the detected magnetic information to the judgment and inspection processor 50. Thus, the judgment and inspection processor 50 calculates an integration of the magnetic information based on the magnetic information detected by the magnetic detecting section 44, and thereby, judges the truth or falsehood of banknote.

Therefore, the magnetic detecting section 44 is designed so that a predetermined output can be obtained when a medium (banknote or test card) having magnetic information passes near the magnetic head surface at a predetermined conveying speed. However, there is the case where stable detection output of magnetic information is not obtained resulting from the conveying speed of medium, inclined conveyance (skew) of medium, or gap change (head touch) of magnetic head and medium.

For example, the faster the conveying speed of the medium becomes, the higher the voltage value as magnetic information detected by the magnetic detecting section 44 becomes. On the other hand, the slower the conveying speed of the medium becomes, the lower the voltage value as magnetic information detected by the magnetic detecting section 44 becomes. As described above, even if the medium is the same, the conveying speed of the medium is different, and thereby, the magnetic detecting section 44 detects different magnetic information.

Therefore, in order to keep and stabilize the performance of the magnetic detecting section 44, it is important to periodically grasp a change of environmental factors such the conveying speed of medium and conveying state.

The magnetic detection pattern T3 of the region R3 on the test card T is used for detecting a conveying speed of medium, conveying state and detection output. For example, as is illustrated in FIG. 17, the region R3 of the test card T is provided with a magnetic detection test pattern (magnetic detection pattern), which comprises seven patterns (magnetic patterns) G to M at the position corresponding to each of the arranged magnetic heads.

As seen from FIG. 17, the first and seventh magnetic patterns G and M are arranged respectively at the leading and trailing ends of the magnetic detection pattern T3 symmetrically with respect to the conveying direction of the test card T. The first and seventh magnetic patterns G and M are a magnetic pattern, which is laterally long and thick with respect to the conveying direction of the test card T, and is detected having strong magnetic information.

The second and sixth magnetic patterns H and L are arranged symmetrically in the magnetic detection pattern T3. Further, the second and sixth magnetic patterns H and L are a magnetic pattern such that the magnetic information is relatively strong detected by the magnetic detecting section 44.

The fourth and fifth magnetic patterns J and K are arranged symmetrically in the magnetic detection pattern T3. Further, the third and fifth magnetic patterns J and K are a magnetic pattern such that magnetic information weaker than the second and sixth magnetic patterns H and L. For example, the magnetic detecting section 44 detects magnetic information having the strength of half of the second and sixth magnetic patterns H and L, from the fourth and fifth magnetic patterns J and K.

The third magnetic pattern I (I1, I2, I3, I4) is arranged at the position such that the magnetic information is not detected by the magnetic detecting section 44, when the test card (medium) T is conveyed at the normal position. In other words, when the test card T is normally conveyed due to skew, the magnetic head of the magnetic detecting section 44 detects the magnetic information from the third magnetic pattern I.

Figures 18A, 18B, 18C, 18D, 18E, 18F:
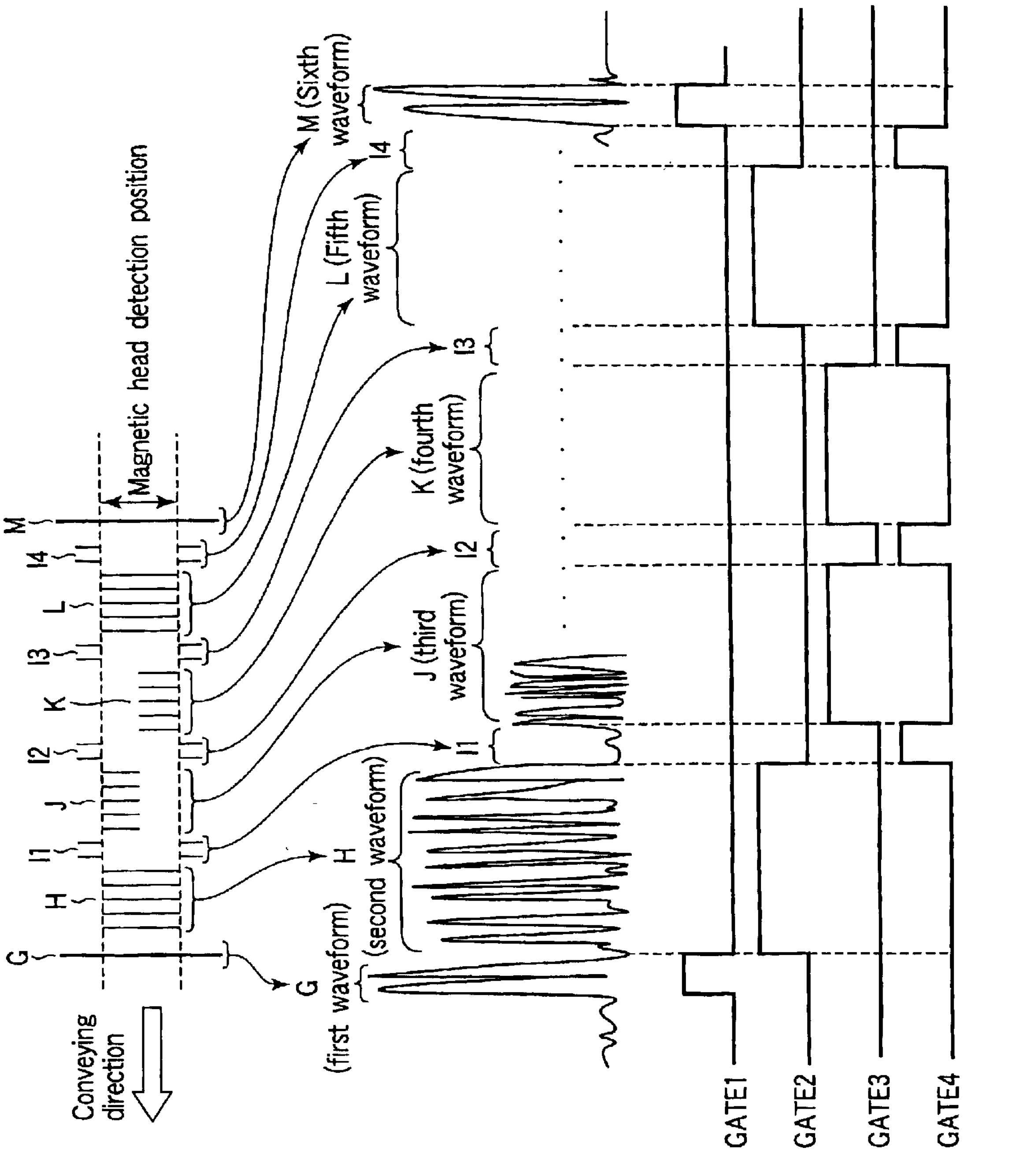
FIG. 18A is a view to explain a feed direction and a detection region with respect to the magnetic detection test pattern.
FIG. 18B is a view showing an output waveform of the magnetic detection test pattern of FIG. 18A.
FIG. 18C is a view showing a first gate signal with respect to the output waveform of FIG. 18B.
FIG. 18D is a view showing a second gate signal with respect to the output waveform of FIG. 18B.
FIG. 18E is a view showing a third gate signal with respect to the output waveform of FIG. 18B.
FIG. 18F is a view showing a fourth gate signal with respect to the output waveform of FIG. 18B.

FIG. 18A shows the relation between the conveying direction of the magnetic detection pattern T3 and the magnetic information detecting position by the magnetic head. FIG. 18B is a view showing a magnetic information detection result (output waveform) by the magnetic detecting section 44 of the magnetic detection pattern T3 of FIG. 18A. FIG. 18C shows a first gate signal (GATE 1) based on the output waveform of the magnetic detecting section 44 shown in FIG. 18B. FIG. 18D shows a second gate signal (GATE 2) based on the output waveform of the magnetic detecting section 44 shown in FIG. 18B. FIG. 18E shows a third gate signal (GATE 3) based on the output waveform of the magnetic detecting section 44 shown in FIG. 18B. FIG. 18F shows a fourth gate signal (GATE 4) based on the output waveform of the magnetic detecting section 44 shown in FIG. 18B.

The first gate signal (GATE 1) is a signal representing time interval from the time when the first magnetic pattern G is detected to the time when the seventh magnetic pattern M is detected, as shown in FIG. 18B and FIG. 18C. Namely, the first gate signal rises up when the first magnetic pattern G is detected and when the seventh magnetic pattern M is detected. Thus, the first gate signal becomes a signal representing the time interval between the first and seventh magnetic patterns G and M.

Therefore, since the distance between the first and seventh magnetic patterns G and M is constant, the judgment and inspection processor 50 can judge the conveying speed of the test card T based on the first gate signal.

The second gate signal (GATE 2) is a signal representing a second waveform corresponding to the second magnetic pattern H from the output waveform, and a fifth waveform corresponding to the sixth magnetic pattern L, as shown in FIG. 18B and FIG. 18D. Namely, the second gate signal becomes an on state (i.e., is turned to "ON") when the second and fifth waveforms are detected. Therefore, based on the second gate signal, the judgment and inspection processor 50 can calculate the average value and integration of the output waveform peak to the magnetic information of the second and sixth magnetic pattern H and L detected by the magnetic detecting section 44.

For example, the integration of the second and fifth waveforms is calculated by integrating the detection output while the second gate signal is in an on state (i.e., is turned to "ON"). The average value of the peak of the second and fifth waveforms is calculated by extracting the peak value of the detection output waveform and making their peak values average while the second gate signal is in an on state.

Here, the explanation has been made based on the following matter. That is, it is presumed that no magnetic information is detected from the third magnetic pattern I (I1 to I4), and the second waveform corresponds to the second magnetic pattern H; on the other hand, the fifth waveform corresponds to the sixth magnetic pattern L.

The third gate signal (GATE 3) is a signal representing a third waveform corresponding to the fourth magnetic pattern J from the output waveform, and a fourth waveform corresponding to the fifth magnetic pattern K, as shown in FIG. 18B and FIG. 18E. Namely, the third gate signal becomes an on state when the third and fourth waveforms are detected. Therefore, based on the third gate signal, the judgment and inspection processor 50 can calculate the average value and integration of the output waveform peak to the magnetic information of the fourth and fifth magnetic pattern J and K detected by the magnetic detecting section 44.

For example, the integration of the third and fourth waveforms is calculated by integrating the detection output while the third gate signal is in an on state. The average value of the peak of the third and fourth waveforms is calculated by extracting the peak value of the detection output waveform and making their peak values average while the third gate signal is in an on state.

Here, the explanation has been made based on the following matter. That is, it is presumed that no magnetic information is detected from the third magnetic pattern I, and the third waveform corresponds to the fourth magnetic pattern J; on the other hand, the fourth waveform corresponds to the fifth magnetic pattern K.

The fourth gate signal (GATE 4) is a signal representing portions corresponding to the third magnetic pattern I (I1 to I4) in whom no detection output appears in normal conveyance, as shown in FIG. 18B and FIG. 18F. Namely, the fourth gate signal becomes an on state between the second and third waveforms, between the third and fourth waveforms, between the fourth and fifth waveforms, and between the fifth and sixth waveforms in the output waveform. Based on the fourth gate signal, the judgment and inspection processor 50 can calculate the integration of detection output of the portion corresponding to the third magnetic pattern I.

For example, the integration of the detection output corresponding to the third magnetic pattern I is calculated by integrating the detection output while the fourth gate signal is in an on state. The average value of the peak of the detection output corresponding to the third magnetic pattern I is calculated by extracting the peak value of the detection output waveform and making their peak values average while the fourth gate signal is in an on state.

Figure 19:
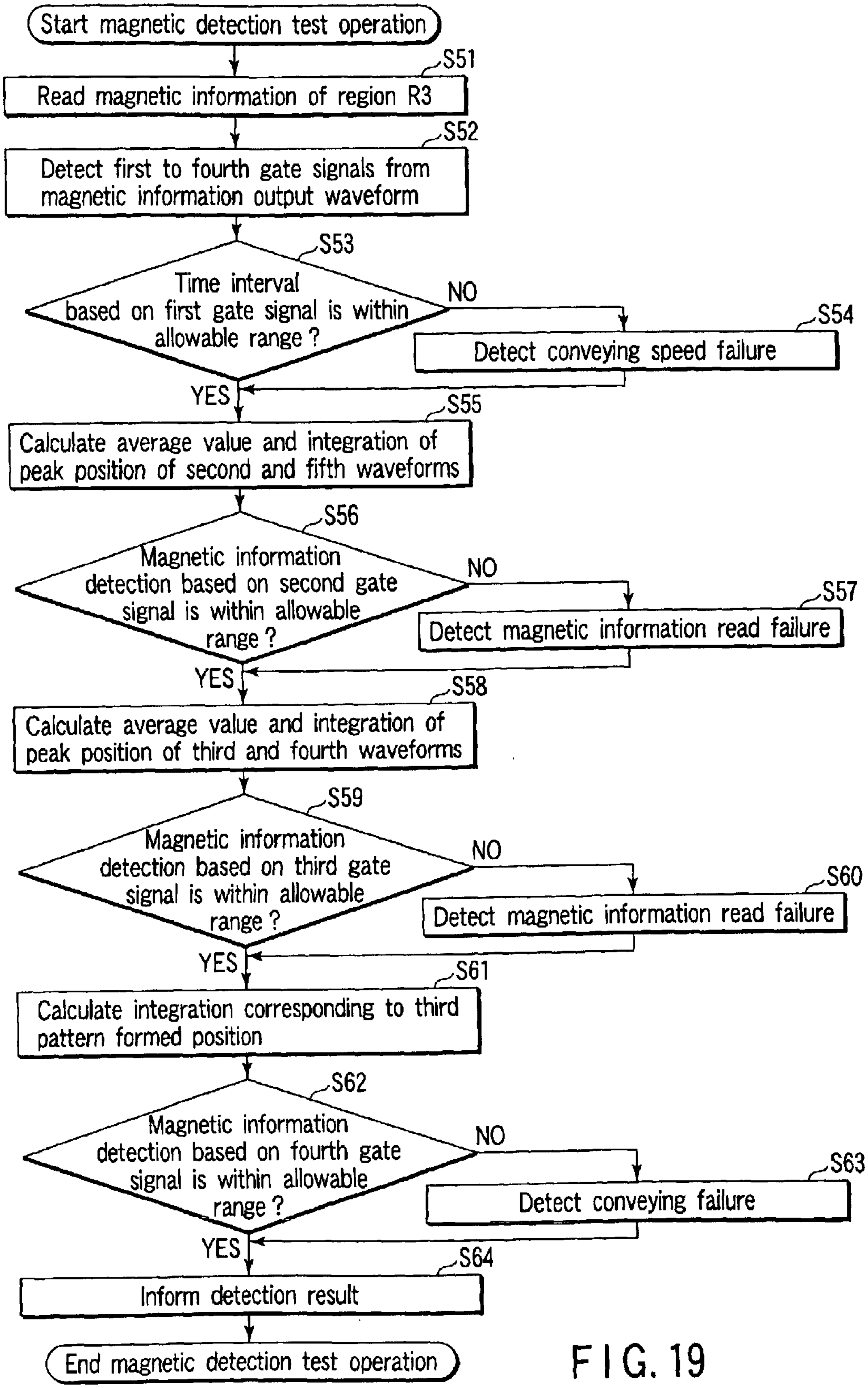
FIG. 19 is a flowchart to explain a test operation of a magnetic detecting section.

The test operation of the magnetic detecting section 44 using the magnetic detection pattern T3 will be described below with reference to the flowchart shown in FIG. 19.

When the test card T is conveyed and the region R3 passes the magnetic detecting section 44, the magnetic detecting section 44 detects magnetic information from the magnetic detection pattern T3, and converts the detected magnetic information into a voltage value (step S51). Therefore, the magnetic detection result of the magnetic detection pattern T3 of the region R3 is detected as a voltage output waveform. The judgment and inspection processor 50 detects the first to fourth gate signals based on the output waveform detected by the magnetic detecting section 44 (step S52).

The judgment and inspection processor 50 first detects the time interval between the first magnetic pattern G and the seventh magnetic pattern M based on the first gate signal. Thereafter, the judgment and inspection processor 50 judges whether or not the time interval is within an allowable range previously stored in the memory 50*a* (step S53).

From the above judgment, if it is determined that the time interval is within the allowable range (step S53, YES), the judgment and inspection processor 50 judges that a conveying speed of the test card T is normal.

From the judgment of the above step S53, if it is determined that the time interval is out of the allowable range (step S53, NO), the judgment and inspection processor 50 detects a failure of the conveying speed of the test card T (step S54).

The judgment and inspection processor 50 calculates the average value and integration of the peak value of the second waveform corresponding to the second magnetic pattern H and the fifth waveform corresponding to the sixth magnetic pattern L based on the second gate signal and the output value from the magnetic detecting section 44 (step S55). When calculating the average value and integration of the peak value of the second and fifth waveforms, the judgment and inspection processor 50 determines whether or not the calculated average value and integration (magnetic information detection) of the peak value is within an allowable range previously stored in the memory 50*a* (step S56).

From the above judgment, if the magnetic information detection is within the allowable range (step S56, YES), the judgment and inspection processor 50 judges that magnetic information read by the magnetic detecting section 44 to the second and sixth magnetic patterns H and L is normal.

From the judgment of the above step S56, if the magnetic information detection is out of the allowable range (step S56, NO), the judgment and inspection processor 50 detects a magnetic information read failure by the magnetic detecting section 44 to the second and sixth magnetic patterns H and L is abnormal (step S57).

The judgment and inspection processor 50 calculates the average value and integration of the peak value of the third waveform corresponding to the fourth magnetic pattern J and the fourth waveform corresponding to the fifth magnetic pattern K based on the third gate signal and the output value from the magnetic detecting section 44 (step S58). When calculating the average value and integration of the peak value of the third and fourth waveforms, the judgment and inspection processor 50 determines whether or not the calculated average value and integration (magnetic information detection) of the peak value is within an allowable range previously stored in the memory 50*a* (step S59).

From the above judgment, if the magnetic information detection is within the allowable range (step S59, YES), the judgment and inspection processor 50 judges that magnetic information read by the magnetic detecting section 44 to the fourth and fifth magnetic patterns J and K is normal.

From the judgment of the above step S59, if the magnetic information detection is out of the allowable range (step S59, NO), the judgment and inspection processor 50 detects a magnetic information read failure by the magnetic detecting section 44 to the fourth and fifth magnetic patterns J and K is abnormal (step S60).

The judgment and inspection processor 50 calculates the integration of the portion corresponding to the third magnetic pattern based on the fourth gate signal and the output value from the magnetic detecting section 44 (step S61). When calculating the integration of the portion corresponding to the third magnetic pattern, the judgment and inspection processor 50 determines whether or not the calculated integration is within an allowable range previously stored in the memory 50*a* (step S62).

From the above judgment, if it is determined that the integration of the portion corresponding to the third magnetic pattern is within the allowable range (step S62, YES), the judgment and inspection processor 50 judges that a conveying speed of the test card T is normal.

From the judgment of the above step S62, if it is determined that the integration of the portion corresponding to the third magnetic pattern is out of the allowable range (step S62, NO), the judgment and inspection processor 50 detects a conveyance failure such as skew (step S63).

In the above step S62, when the test card T is conveyed in a normal state, a failure of conveying condition of the test card T is detected by checking whether or not the magnetic information of no-detected position is detected more than the allowable range.

The judgment and inspection processor 50 gives the above judgment results of steps S51 to S63 to the control section 21 (step S64). The control section 21 makes the comprehensive judgment inclusive of the test operation results of other detecting sections, as the need arises, thereafter, gives the judgment result to the teller machine 3 via the interface 24. Thus, the teller machine 3 displays the above judgment result on the display section 3*a* so that the operator can see it.

As described above, the magnetic detecting section of the judgment and inspection unit detects various magnetic patterns formed on the test card as the magnetic detection pattern. The judgment and inspection processor compares the detection result of the magnetic detecting section with the predetermined allowable range. Based on the comparative result, the judgment and inspection processor determines whether or not the magnetic information read state, the sheet conveying speed and the conveying condition are normal. The above judgment result is displayed on the display section so that the operator can see it.

By doing so, based on the detection result of the test card by the magnetic detecting section, maintenance is recommended to the operator. Therefore, it is possible to readily and securely perform the maintenance for the judgment and inspection unit, the magnetic detecting section or conveyor.

The following is a description of the maintenance of the fluorescent detecting section 45.

The fluorescent detecting section 45 reads the region R4 of the test card T, and thereby, its function and performance are tested.

Figure 20:
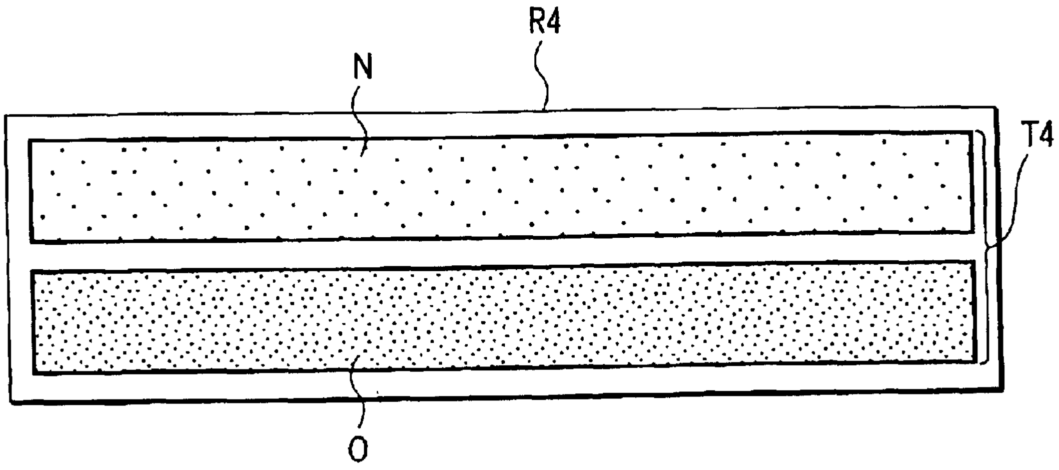
FIG. 20 is a view showing a fluorescent detection test pattern.

FIG. 20 is a view showing a fluorescent detection test pattern (fluorescent detection pattern) T4 detected by the fluorescent detecting section 45.

The fluorescent detection pattern T4 is formed on the region R4 of the test card T. The fluorescent detection pattern T4 formed on the region R4 is a test pattern for inspecting the condition of the fluorescent detecting section 45.

More specifically, in maintenance, the fluorescent detecting section 45 reads the fluorescent detection pattern formed on the region R4 of the test card T. The judgment and inspection processor 50 compares the pattern read by the fluorescent detecting section 45 with a predetermined allowable range, and thereby, determines the condition of the fluorescent detecting section 45.

As seen from FIG. 20, the fluorescent detection pattern T4 formed on the region R4 of the test card T is formed of two kinds of fluorescent detection test patterns (fluorescent pattern) N and O. As shown in FIG. 20, a first fluorescent pattern N is a pattern in which fluorescent emitting ink is thin printed. On the other hand, a second fluorescent pattern O is a pattern in which fluorescent emitting ink is printed thicker than the first fluorescent pattern.

The fluorescent detecting section 45 comprises a plurality of sensors for detecting fluorescent emitting pixels. The sensors read only fluorescent emitting pattern previously printed on the banknote. Further, the fluorescent detecting section 45 outputs image information representing the read fluorescent pattern to the judgment and inspection processor 50. The judgment and inspection processor 50 determines whether the banknote is true or false according to the fluorescent pattern previously printed on the banknote based on the image information of the read fluorescent pattern.

Therefore, in the above fluorescent detecting section 45, it is important that the read sensitivity is a normal condition. The fluorescent detection pattern T4 is used for determining whether or not the read sensitivity of the fluorescent patter by the fluorescent detecting section 45 is normal.

Figure 21:
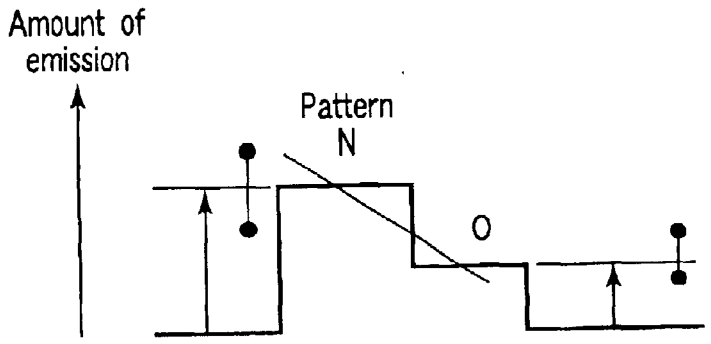
FIG. 21 is a view showing a reference value and an allowable value with respect to the fluorescent detection test pattern.

FIG. 21 is a view showing an amount emitting from two fluorescent patterns N and O shown in FIG. 20.

When the fluorescent detecting section 45 reads the fluorescent detection pattern T4 comprising two fluorescent patterns N and O having different density, the read result shown in FIG. 21 is obtained. The amount of emission of the fluorescent patterns N and O read by the fluorescent detecting section 45 is detected from the read result of the fluorescent patterns N and O.

That is, the judgment and inspection processor 50 determines whether or not the amount of emission of the fluorescent patterns N and O read by the fluorescent detecting section 45 is within a predetermined allowable range. In addition, the judgment and inspection processor 50 determines whether or not a sensitivity gradient based on the amount of emission read from the fluorescent patterns N and O is within a predetermined allowable range.

The judgment and inspection processor 50 determines whether or not the difference of sensitivity gradient between sensors is within a predetermined allowable range, with respect to the plurality of sensors constituting the fluorescent detecting section 45. By doing so, it is possible to detect the presence of non-uniformity in sensitivity between sensors. The difference in sensitivity gradient between sensors is considered as resulting from filter deterioration.

Figure 22:
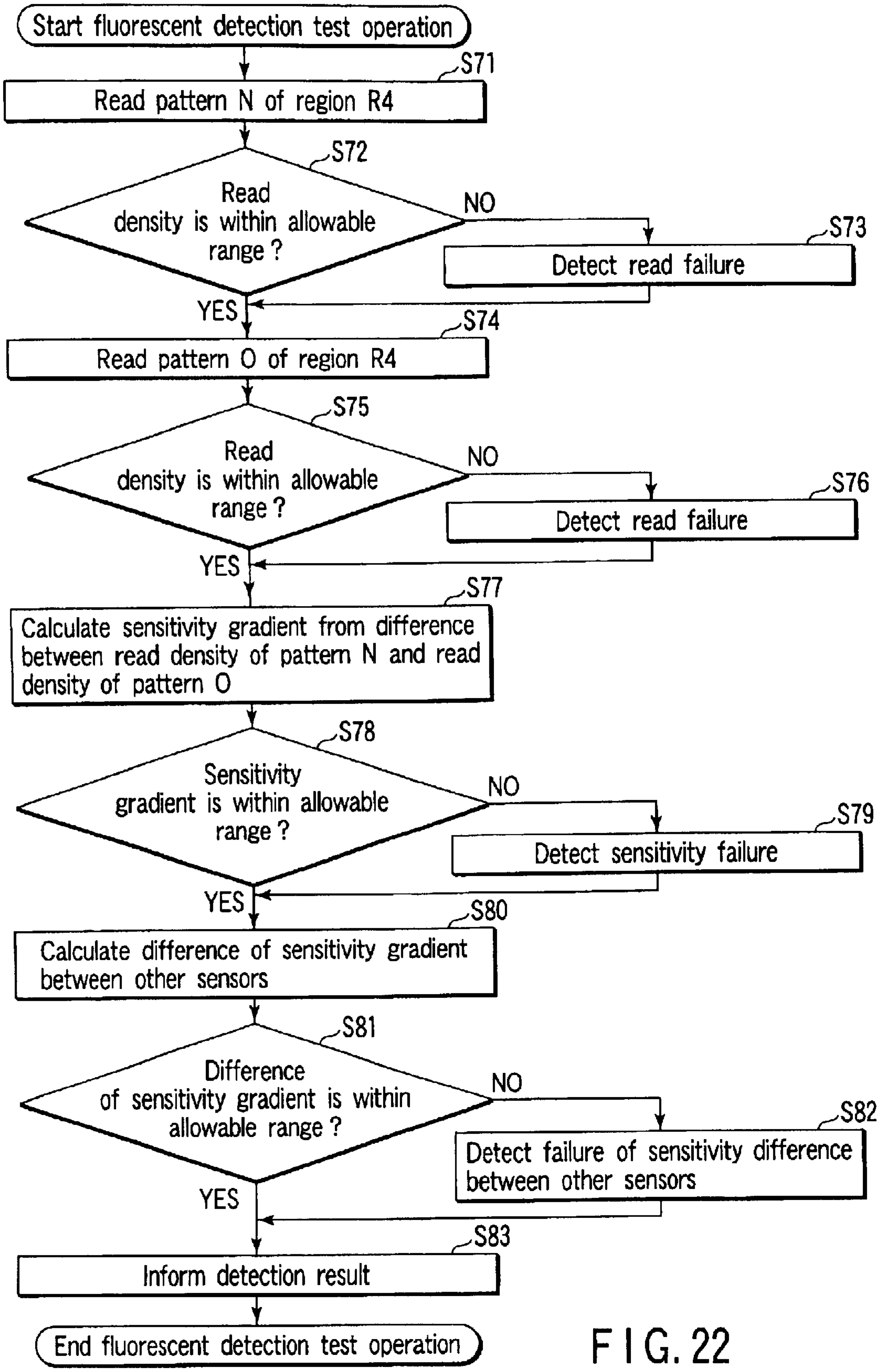
FIG. 22 is a flowchart to explain a test operation of a fluorescent detecting section.

The test operation by the fluorescent detecting section 45 using the fluorescent detection pattern T4 will be described below with reference to a flowchart shown in FIG. 22.

When the test card T is conveyed and the region R4 passes the fluorescent detecting section 45, the fluorescent detecting section 45 successively reads the first and second fluorescent patterns N and O (step S71). First, when the fluorescent detecting section 45 reads the first fluorescent pattern N (step S71), the judgment and inspection processor 50 determines whether or not the amount of emission of the first fluorescent pattern N read by the fluorescent detecting section 45 is within an allowable range previously stored in the memory 50*a* (step S72).

From the above judgment, if it is determined that the amount of emission of the first fluorescent pattern N read by the fluorescent detecting section 45 is within the allowable range (step S72, YES), the judgment and inspection processor 50 determines that the read density with respect to the first fluorescent pattern N is normal.

From the judgment of the above step S72, if it is determined that the amount of emission of the first fluorescent pattern N read by the fluorescent detecting section 45 is out of the allowable range (step S72, NO), the judgment and inspection processor 50 detects a read failure with respect to the density of the first fluorescent pattern N (step S73).

When the fluorescent detecting section 45 reads the second fluorescent pattern O (step S74), the judgment and inspection processor 50 determines whether or not the amount of emission of the second fluorescent pattern O read by the fluorescent detecting section 45 is within an allowable range previously stored in the memory 50*a* (step S75).

From the above judgment, if it is determined that the amount of emission of the second fluorescent pattern O read by the fluorescent detecting section 45 is within the allowable range (step S75, YES), the judgment and inspection processor 50 determines that the read density with respect to the second fluorescent pattern O is normal.

From the judgment of the above step S75, if it is determined that the amount of emission of the second fluorescent pattern O read by the fluorescent detecting section 45 is out of the allowable range (step S75, NO), the judgment and inspection processor 50 detects a read failure with respect to the density of the second fluorescent pattern O (step S76).

The judgment and inspection processor 50 calculates a sensitivity gradient from the difference between the amount of emission read from the first fluorescent pattern N and the amount of emission read from the second fluorescent pattern O (step S77). When calculating the sensitivity gradient, the judgment and inspection processor 50 determines whether or not the calculated sensitivity gradient is within a predetermined allowable range previously stored in the memory 50*a* (step S78).

From the above judgment, if it is determined that the sensitivity gradient is within the predetermined allowable range (step S78, YES), the judgment and inspection processor 50 determines that the sensitivity of the sensor of the fluorescent detecting section 45 is normal.

From the above judgment of step S78, if it is determined that the sensitivity gradient is out of the predetermined allowable range (step S78, NO), the judgment and inspection processor 50 detects a sensitivity failure of the sensor of the fluorescent detecting section 45 (step S79).

The judgment and inspection processor 50 calculates the difference of the sensitivity gradient between plural sensors of the fluorescent detecting section 45 (step S80). In addition, the judgment and inspection processor 50 determines whether or not the calculated sensitivity gradient is within a predetermined allowable range previously stored in the memory 50*a* (step S81).

From the above judgment, if it is determined that the difference of the sensitivity gradient is within the predetermined allowable range (step S81, YES), the judgment and inspection processor 50 determines that the difference of the sensitivity between the sensors is normal.

From the above judgment of step S81, if it is determined that the difference of the sensitivity gradient is out of the predetermined allowable range (step S81, NO), the judgment and inspection processor 50 detects a failure of sensitivity difference between the sensors (step S82).

The judgment and inspection processor 50 gives the judgment result of the above steps S71 to S82 to the control section 21 (step S83). The control section 21 makes comprehensive judgments inclusive of the test operation results of other detecting sections, as the need arises, thereafter, gives the judgment results to the teller machine 3 via the interface 24. The teller machine 3 displays the judgment results on the display section 3*a* so that the operator can see it.

As described above, the fluorescent detecting section of the judgment and inspection unit reads the fluorescent detection test pattern formed on the test card. The judgment and inspection processor compares the fluorescent amount read by the fluorescent detecting section with the predetermined allowable range, and determines whether or not the read sensitivity by the fluorescent detecting section is normal. The judgment result is given to the operator via the display section.

By doing so, based on the read result of the test card by the fluorescent detecting section, maintenance is recommended to the operator. Therefore, it is possible to readily and securely perform the maintenance for the judgment and inspection unit or the fluorescent detecting section.

The following is a description of the overall judgment operation when giving the detection result by the test card T to the teller machine.

The judgment result of the test operation by the image detecting section 40, thickness detecting section 46, magnetic detecting section 44 and fluorescent detecting section 45 is transmitted to the teller machine 3 via the control section 21. Therefore, the judgment results based on the detection result of the test card T by each detecting section are collected to the control section 21. Thus, the control section 21 can totally evaluates the function and performance of the judgment and inspection unit based on the judgment results relevant to each detecting section.

For example, the control section 21 can judge the conveying condition of the test card T based on the detection result by each detecting section. Further, the control section 21 can judge a degree of dirt or deterioration of each sensor in the judgment and inspection unit 7 based on the detection result by each detecting section. The above overall judgment result in the judgment and inspection unit 7 is transferred to the teller machine 3, and hereby, it is possible to display the overall condition of the judgment and inspection unit 7 on the display section 3*a*.

By doing so, it is possible to simply give the information on the overall condition of the apparatus for processing a sheet or the whole condition of the judgment and inspection unit to the operator, and to support the operator's maintenance work.

The following is a description of the summary of the above embodiment.

As described above, detecting sections such as image detecting section, thickness detecting section, magnetic detecting section and fluorescent detecting section detect various test patterns formed on the test card. The judgment and inspection processor compares the detection result with a previously stored reference threshold value of each detecting section, and judges the operating condition of the apparatus for processing a sheet. The control section displays the judgment result of the operating condition of the apparatus for processing a sheet on the display section.

By doing so, the operator merely sets the test card T on the apparatus for processing a sheet, and thereby, can recognize the operating condition of the apparatus for processing a sheet. Therefore, high accurate maintenance and management can be achieved without depending on operator's skill.

The supply section supplies the test card in which various test patterns corresponding to detecting sections are formed, to the apparatus for processing a sheet. Each detecting section detects the test pattern formed on the test card. The judgment and inspection processor compares the detection result with a previously stored reference threshold value of each detecting section, and judges the operating condition of each detecting section. The control section displays the judgment result of the operating condition of each detecting section on the display connected to the sheet processing section.

By doing so, evaluation and maintenance can be simply achieved without individual difference such as operator's skill; therefore, high accurate maintenance and management can be realized.

Further, the supply section supplies the test card in which various test patterns corresponding to detecting sections are formed, to the apparatus for processing a sheet. Each detecting section detects the test pattern formed on the test card. The judgment and inspection processor compares the detection result with a previously stored reference threshold value of each detecting section, and judges the operating condition of each detecting section. The control section displays the operating condition and the detection result of each detecting section on the display connected to the sheet processing section.

By doing so, evaluation and maintenance can be simply achieved without individual difference, and the next maintenance can be expected; therefore, high accurate maintenance and management can be readily and securely realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for processing a sheet, which inspects a sheet, and processes the sheet based on the inspection result, comprising:

an insert section which inserts the sheet;

a conveying section which conveys the sheet inserted into the insert section;

a detecting section which detects features from the sheet conveyed by the conveying section;

an inspection section which inspects the sheet based on the features detected by the detecting section;

a judgment section which judges a condition of the apparatus based on the features detected by the detecting section from a medium conveyed by the conveying section when the medium having the features formed in a predetermined pattern is inserted into the insert section; and an information giving section which gives information on the judgment result by the judgment section.

2. The apparatus according to claim 1, wherein the detecting section comprises a plurality of detecting sections which individually detect plural kinds of features from the sheet conveyed by the conveying section, the inspection section inspects the sheet based on plural kinds of features detected by the plurality of detecting sections, and when a medium having the features formed in a predetermined pattern is inserted into the insert section, the judgment section compares plural kinds of features detected from a medium conveyed by the conveying section by the plurality of detecting sections with a predetermined reference value corresponding to each feature, and judges a condition of the apparatus.

3. The apparatus according to claim 1, wherein the detecting section is an image detecting section which detects an image on the sheet, the inspection section inspects the sheet based on the image on the sheet detected by the image detecting section, and when a medium having a predetermined image is inserted into the insert section, the judgment section compares the image information detected by the image detecting section from the medium conveyed by the conveying section with a predetermined reference value, and judges the image detection condition by the image detecting section.

4. The apparatus according to claim 3, wherein the image detecting section has an image correcting section which corrects the detected image, and when a medium having a predetermined image is inserted into the insert section, the judgment section judges image correction by the image correcting section based on the image information detected by the image detecting section from the medium conveyed by the conveying section.

5. The apparatus according to claim 1, wherein the detecting section is a thickness detecting section which detects a thickness of the sheet, the inspection section inspects the thickness of the sheet based on thickness information detected by the thickness detecting section, and when a medium having a predetermined thickness is inserted into the insert section, the judgment section compares the thickness information detected by the thickness detecting section from the medium conveyed by the conveying section with a predetermined reference value, and judges the thickness detection condition by the thickness detecting section.

6. The apparatus according to claim 1, wherein the detecting section is a magnetic detecting section which detects magnetic information on the sheet, the inspection section inspects the sheet based on magnetic information detected by the magnetic detecting section, and when a medium having a predetermined pattern magnetic information is inserted into the insert section, the judgment section compares the magnetic information detected by the magnetic detecting section from the medium conveyed by the conveying section with a predetermined reference value, and judges the magnetic detection condition by the magnetic detecting section.

7. The apparatus according to claim 6, wherein when the medium having a predetermined pattern magnetic information is inserted into the insert section, the judgment section compares a detection timing of the magnetic information detected by the magnetic detecting section from the medium conveyed by the conveying section with a predetermined reference value, and judges a conveying condition of the sheet by the conveying section.

8. The apparatus according to claim 1, wherein the detecting section is a fluorescent detecting section which detects a fluorescent emitting pattern, which is fluorescent and emitting on the sheet, the inspection section inspects the sheet based on the fluorescent emitting pattern detected by the fluorescent detecting section, and when a medium having a fluorescent and emitting predetermined pattern is inserted into the insert section, the judgment section compares the fluorescent pattern detected by the fluorescent detecting section from the medium conveyed by the conveying section with a predetermined reference value, and judges the fluorescent pattern detection condition by the fluorescent detecting section.

* * * * *